Feb. 26, 1963 G. A. PAGONIS 3,079,451
APPARATUS FOR TREATING TITANIUM AND OTHER METALS
Original Filed May 4, 1955 9 Sheets-Sheet 1

INVENTOR
GEORGE A. PAGONIS

INVENTOR
GEORGE A. PAGONIS

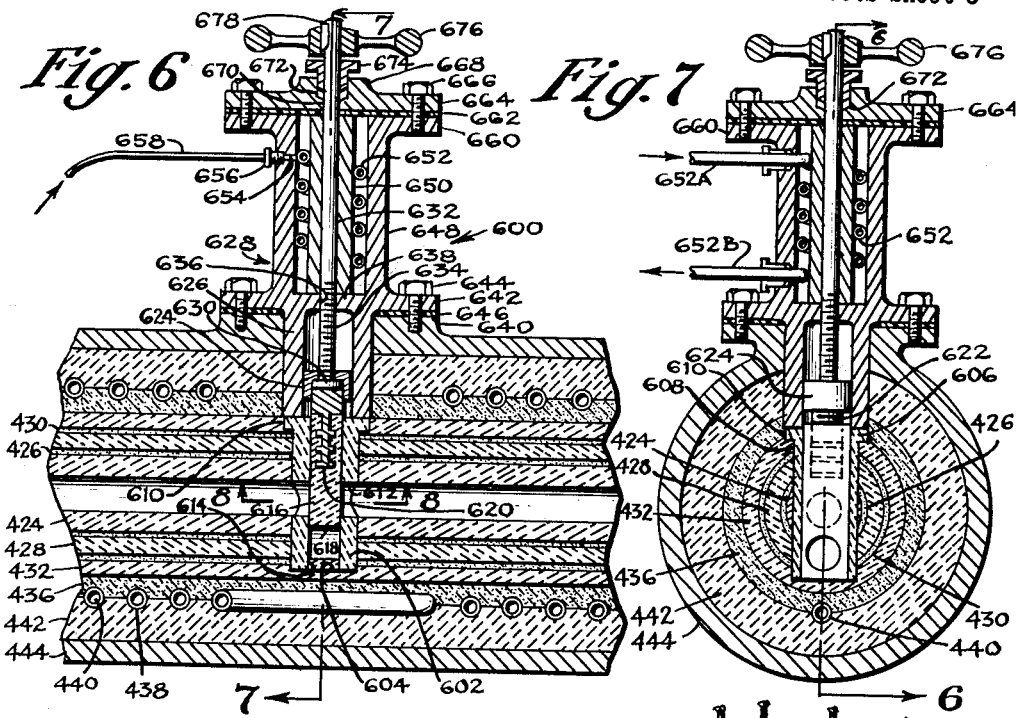
Fig. 6  Fig. 7
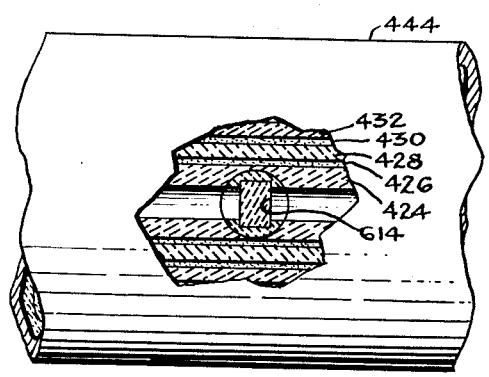
Fig. 8
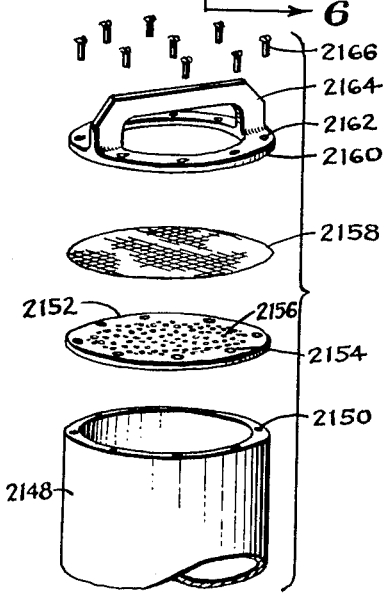
Fig. 19
Fig. 23
INVENTOR
GEORGE A. PAGONIS

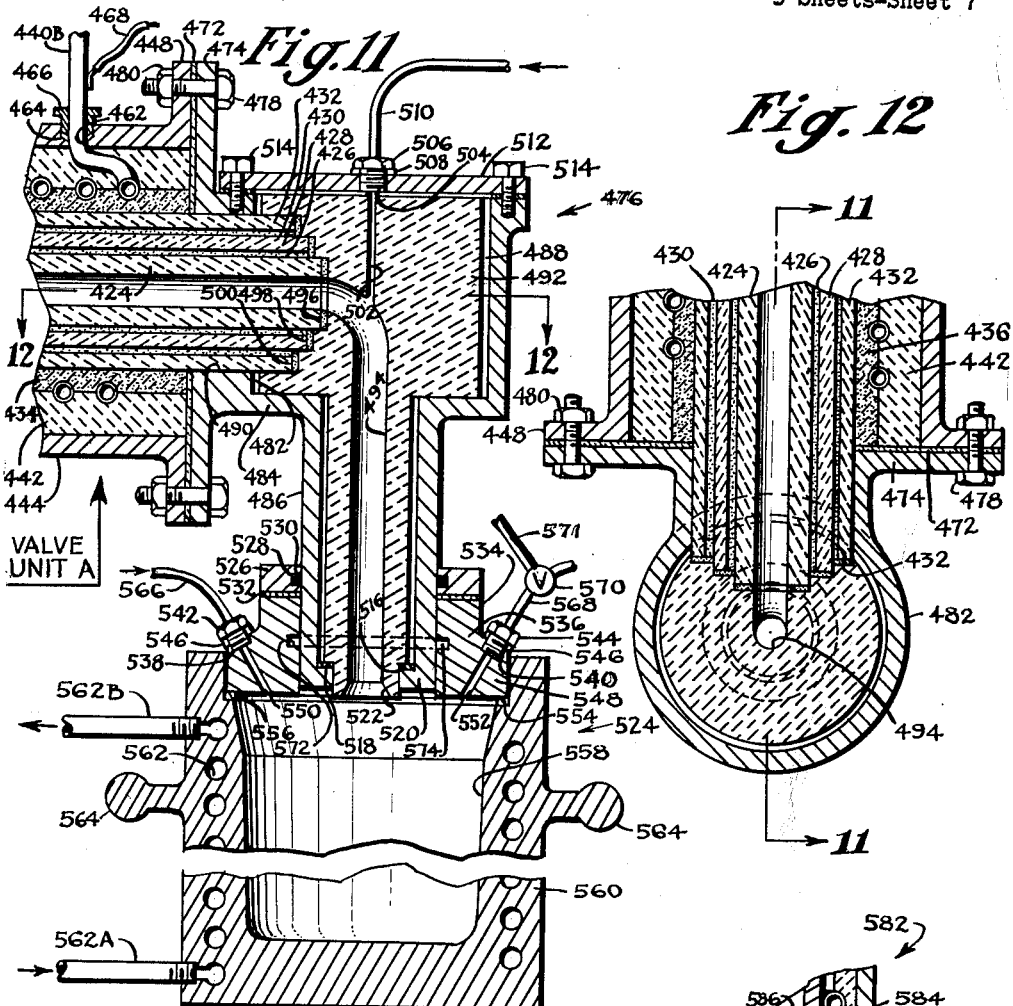
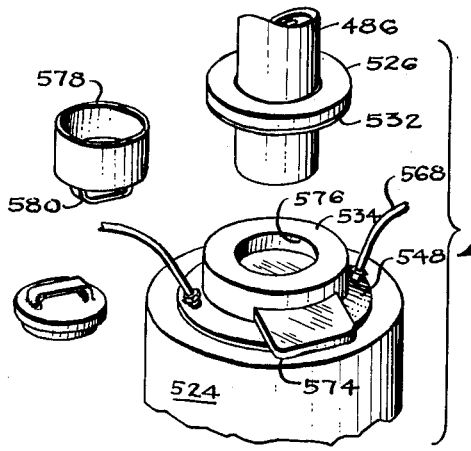
Feb. 26, 1963 G. A. PAGONIS 3,079,451
APPARATUS FOR TREATING TITANIUM AND OTHER METALS
Original Filed May 4, 1955 9 Sheets-Sheet 7
INVENTOR
GEORGE A. PAGONIS Feb. 26, 1963 G. A. PAGONIS 3,079,451
APPARATUS FOR TREATING TITANIUM AND OTHER METALS
Original Filed May 4, 1955 9 Sheets-Sheet 8
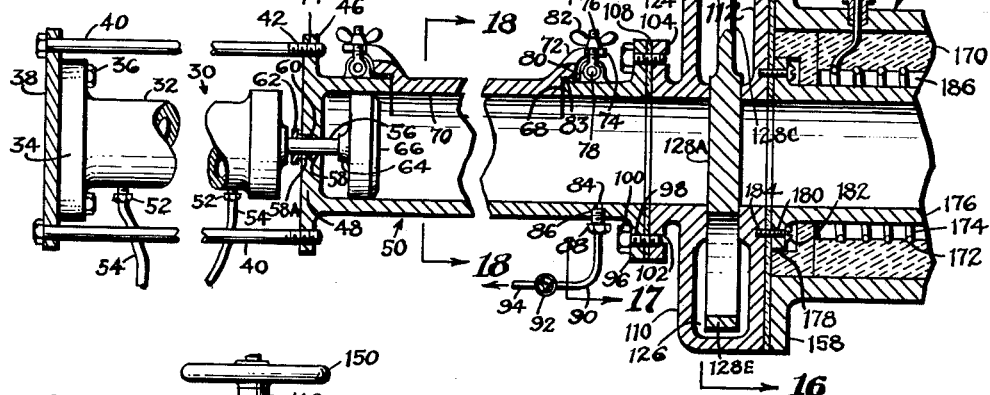
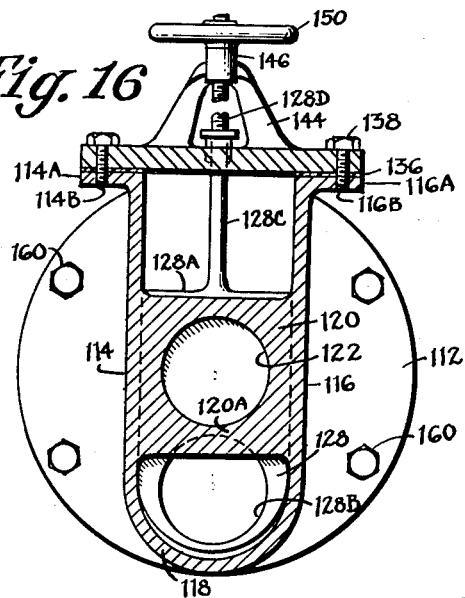
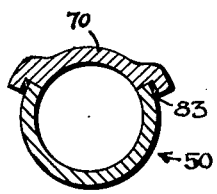
INVENTOR
GEORGE A. PAGONIS

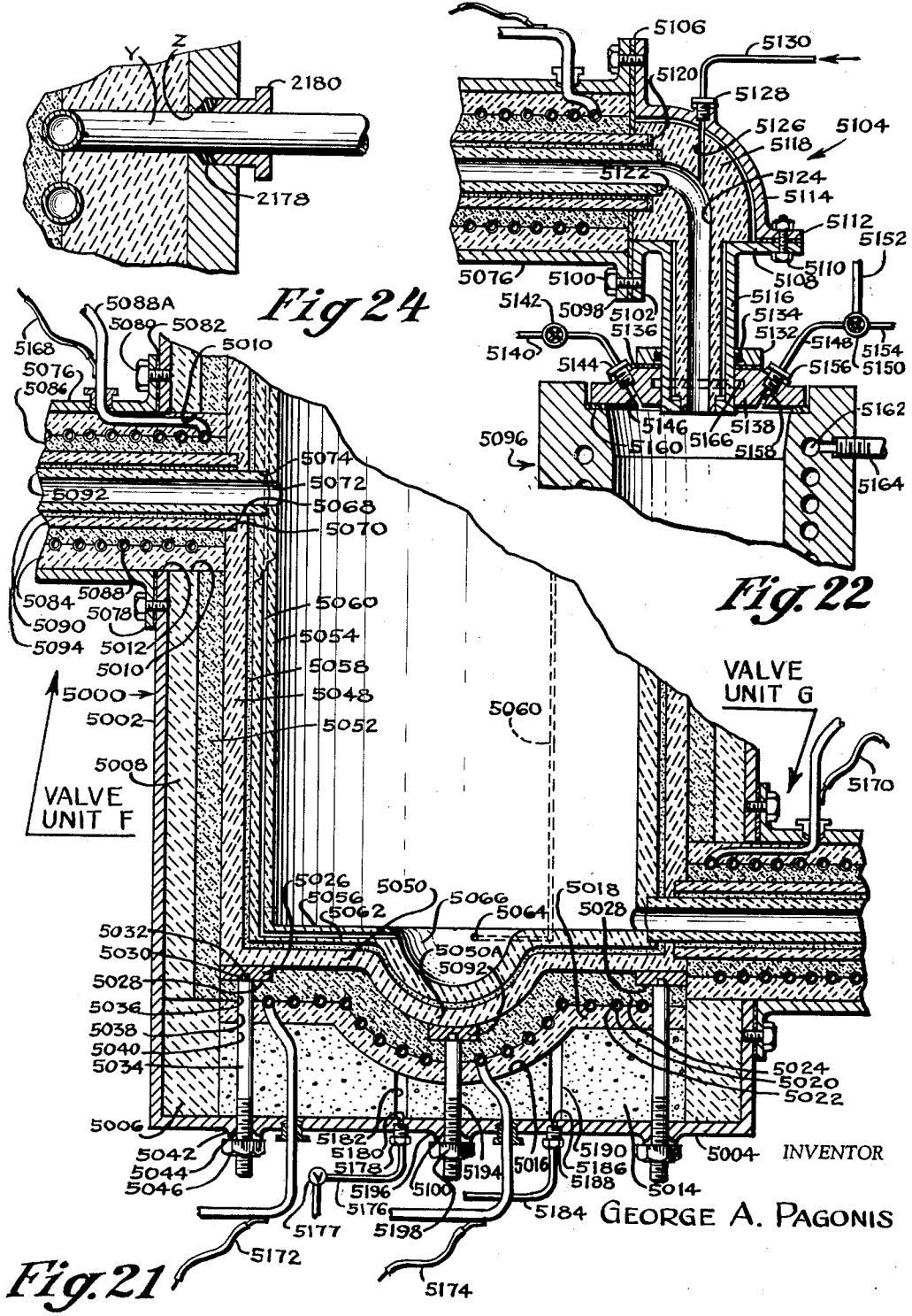

United States Patent Office 3,079,451
Patented Feb. 26, 1963

3,079,451
APPARATUS FOR TREATING TITANIUM AND OTHER METALS
George A. Pagonis, San Jose, Calif., assignor, by mesne assignments, to Light Metals Research Laboratory, Inc., San Jose, Calif., a corporation of California
Continuation of application Ser. No. 505,887, May 4, 1955. This application Nov. 24, 1958, Ser. No. 775,994
28 Claims. (Cl. 13—27)

This invention relates to a novel continuous multi-stage apparatus for producing commercially pure titanium or base alloys of high purity and homogeneous uniformity and comprises a continuation of my copending application entitled, "Process for Treating Titanium Metals," Serial No. 505,887, and filed May 4, 1955, now abandoned.

The invention also pertains to the recovery of titanium scrap, the purification and realloying of the same.

One of the primary objects of this invention is to provide apparatus which will improve the physical, mechanical and chemical properties of present day commercially pure titanium and titanium base alloys through the use of a unique high frequency induction device employing refractories, in order to produce titanium and its base alloys having a high degree of purity and consistent uniformity.

Additionally, and as a further object of this invention, it is proposed to provide means for recovering titanium scrap metal and to cast ingots, billets, castings or test bars therefrom, the products having a homogeneous uniformity and grain refinement whereby Government agencies, private industries, and national testing associations are enabled to certify and register specifications of commercially pure titanium and titanium base alloys, the specifications to be of standard compositions resulting in predetermined physical, mechanical and chemical properties of the end products thereby enabling research laboratories to further the improvement and to produce titanium base alloys of higher stability and which will withstand fatigue, stresses and strains at elevated temperatures, thus enabling an earlier evaluation of the titanium and titanium base alloys and hastening its applications in many more fields inviting higher demands and competition to lower the fabricated cost.

The apparatus employed according to the present invention makes it possible for men skilled in this art to evaluate titanium and titanium base alloys in such a manner that their use in wider fields may be speedily appreciated, thereby inviting higher commercial demands for such metals and to increase competition between manufacturers to bring about lower costs in the fabricated article.

Another object of this invention is to provide commercially pure titanium and its base alloys and a multi-stage apparatus to purify and alloy titanium while in its molten state through the introduction of a scavenger composition or improver elements, and to alloy the titanium by this multi-stage apparatus, an achievement which can not be obtained by the present day arc melting apparatuses which are of such nature as to prohibit such a procedure.

A still further object of this invention is to provide a novel means for loading, neutralizing and preheating titanium sponge metal, ingot or scrap, without necessitating the preprocessing steps of leaching, washing and granulating such metals according to the present day practices pertaining to methods of melting and alloying the aforesaid metals.

It should be further recognized that in addition to the prior art methods presently employed for recovering scrap, wherein it is necessary that the titanium be reduced by machining and granulating the same in order to reclaim it, still another prior art method requires that the scrap sheet must be welded in order to form an elongated electrode which is used in the arc process for reducing the metal in order to obtain a titanium sponge ingot metal melt. Both of these methods are costly and impractical, and through the practice of the present invention the apparatus herein involved completely eliminates the above mentioned operations for the recovery of the scrap, thereby materially reducing the recovery costs.

This invention contemplates as a still further object the provision of crucibles having divisional refractories, the compositions thereof remaining neutral while subjected to elevated temperatures so as to effect no reaction with the melt. In this connection, it is a further object of this invention to provide apparatus of the type to which reference has been made above wherein selected refractory materials are disposed between the divisional refractories for the purpose of increasing the electrical currents produced by induction apparatus for heating the molten metal or melt, and which are employed in connection with the refractory members to increase the speed of penetration of the magnetic field without effecting skin penetration of the refractories.

Also within the purview of this object of the invention is the provision of induction heating means which, through its special construction and location, eliminates all possibility of over-heating the entire crucible liner.

This invention contemplates as a still further object thereof the provision of means in metal treating apparatus for holding and confining neutralizing, scavenger, or improver elements for preheating within the apparatus as well as unique valve means for releasing the neutralizing, scavenger and improver elements for deposit within the apparatus at such time as these materials may be required.

As a still further object of this invention, it is proposed to provide a new and novel means for transferring and controlling the flow of molten material between two or more adjacent metal treating devices.

It is within the purview of this invention to provide as a further object thereof, the provision of a means for confining and neutralizing the predetermined alloying elements, together with means for neutralizing and preheating the alloying elements, and means for discharging the predetermined alloying elements into the melt in order to obtain a substantially homogenized melt.

A further object of this invention is to construct an adaptor for pouring under an atmospheric confinement titanium molten material and discharging it into an ingot mold, billets, castings or bars.

It is a still further object of this invention to provide multi-stage metallurgical apparatus of the type referred to supra, the apparatus being adapted for air tight connection between its several component parts, and operated under inert gas atmospheres and vacuum for each complete cycle of operation of the apparatus, the construction of the apparatus being such as to preclude the entry of the ambient atmosphere therein at any stage during the operation thereof.

It is a still further object of this invention to provide metallurgical apparatus of the type generally referred to above, which is relatively inexpensive to manufacture, non-complex in construction and assembly, and extremely durable in use.

Other and further objects and advantages of this invention will become more apparent from a consideration of the following specification when read in conjunction with the annexed drawings, in which:

FIGURE 6 is a vertical cross-sectional view of one of the cylindrical conduits and valves connecting and controlling the flow of molten metal between adjacent crucibles, the view being taken on the vertical plane of line 6—6 of FIGURE 7, looking in the direction of the arrows.

FIGURE 7 is a vertical cross-sectional view taken on the vertical plane of line 7—7 of FIGURE 6, looking in the direction of the arrows.

FIGURE 8 is a horizontal cross-sectional view, partly in elevation, taken on the horizontal plane of line 8—8 of FIGURE 6, looking in the direction of the arrows.

FIGURE 11 is a vertical cross-sectional view taken on the vertical plane of the line 11—11 of FIGURE 12, looking in the direction of the arrows, illustrating the connection between the crucibles and the ingot mold.

FIGURE 12 is a horizontal cross-sectional view taken on the horizontal plane of line 12—12 of FIGURE 11, looking in the direction of the arrows.

FIGURE 13 illustrates a modified form of the mold illustrated in FIGURE 11.

FIGURE 14 is a fragmentary perspective view of the mold, cap, its flange, and the closure member for the molten metal discharge assembly therefor.

FIGURE 15 is a vertical cross-sectional view, partially in elevation, showing the loading, neutralizing, and preheating apparatus adapted for use in conjunction with the crucible illustrated in FIGURE 2 of the drawings.

FIGURE 16 is a vertical cross-sectional view, partly in elevation, taken on the line 16—16 of FIGURE 15, looking in the direction of the arrows, and illustrating the details of the valve assembly interposed between the charging chamber and the first of the crucibles.

FIGURE 17 is a vertical cross-sectional view of the charging and neutralizing chamber, taken on the vertical plane of line 17—17 of FIGURE 15, looking in the direction of the arrows.

FIGURE 18 is a vertical cross-sectional view taken on the vertical plane of line 18—18 of FIGURE 15, looking in the direction of the arrows.

FIGURE 19 is an exploded perspective view of a container or shell adapted for use in connection with the crucible illustrated in FIGURE 3.

FIGURE 20 is a vertical cross-sectional view of apparatus adapted for use in the crucible illustrated in FIGURE 3.

FIGURE 21 is a fragmentary vertical cross-sectional view of a modified form of a crucible constructed in accordance with the present invention.

FIGURE 22 is a fragmentary vertical cross-sectional view of the discharge side of the crucible constructed in accordance with FIGURE 21.

FIGURE 23 is an enlarged vertical cross-sectional view of the cartridge shown in association with FIGURE 4 of the drawings.

FIGURE 24 is a fragmentary detail enlarged cross-sectional view illustrating the packing and fitting means employed in passing a conduit through a refractory and the outer steel casing of a crucible.

THE CHARGING AND NEUTRALIZING APPARATUS

Figure 1:
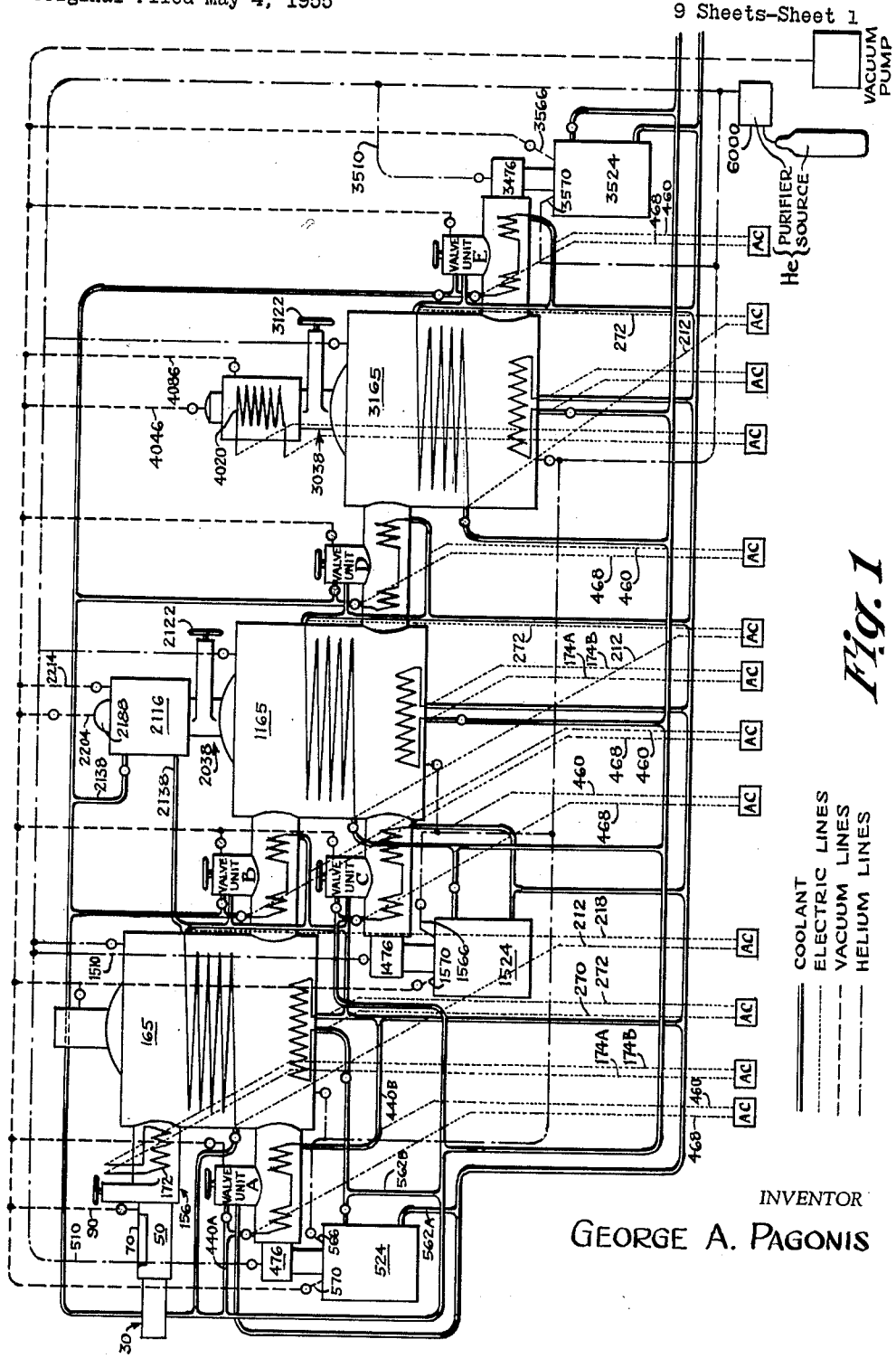
FIGURE 1 is a diagrammatic representation of metallurgical apparatus employed in the present invention for treating titanium or titanium scrap, the apparatus being constructed and arranged in accordance therewith.

Referring now more specifically to the drawings, reference numeral 30 (see FIGURE 15) designates, in general, a hydraulic jack of conventional design having a hollow cylindrical body 32 in which a piston (not shown) is adapted to reciprocate. The flanged base 34 thereof is bolted at 36 to an end frame plate 38 which is traversed by a plurality of elongated bolts 40 having their respective threaded ends 42 received within tapped openings 44 formed in the radial flange 46 of an end well 48 of an elongated cylindrical conduit 50. The jack 30 is connected, adjacent each end of the body 32, by fittings 52 and flexible hoses 54, with a hydraulic circuit (not shown) including valve control means for exerting, alternately, pressure on the opposite sides of the jack piston to effect the reciprocation thereof.

One end of a piston rod 56 is fixedly secured to the jack piston, while the other end thereof extends through an opening 58 formed in the end wall 48 and terminates within the conduit 50. The opening 58 is enlarged at 58A to accommodate a chevron type gasket 60 and is internally threaded to receive the externally threaded fitting 62, the latter holding the gasket 60 against displacement.

The other end of the piston rod 56 has a hub 64 of a material ram head 66 fixedly secured thereto, the head 66 being substantially circular in configuration and being adapted for reciprocation within the conduit 50 in response to the movement of the piston for the jack 30. The cylindrical member 50 is constructed of steel and is provided with a substantially rectangular access opening 68 in the upper side thereof which affords means through which materials to be treated are inserted. A removable closure member 70, also formed of steel and having a substantially rectangular configuration, is provided for the access opening 68, the closure member 70 having a pair of oppositely disposed spaced and upstanding lugs 72 at each end thereof, the lugs being provided with bifurcated ends 74 which are adapted to receive stud bolts 76 mounted on pivot pins 78 fixedly secured in bosses 80 integrally formed with the cylindrical member 50. Wing nuts 82 serve to lock the closure member 70 in its closed position against a substantially rectangular sealing gasket 83.

As illustrated in FIGURE 15, the ram head 66 has been moved to one of its extreme positions and has come to rest at one end of the member 50 at a point remote from a port 84 adjacent the other end of the member 50 which communicates with an enlarged tapped opening 86, the latter receiving a steel fitting 88 to connect one end of a pipe 90 thereto. The other end of the pipe 90 connects with the inlet side of a manually operated valve 92 having its outlet or discharge side thereof connected through pipe 94 with vacuum means (not illustrated).

The other end of the conduit 50 is open and is provided with an outwardly extending radial flange 96 having a plurality of openings 98 extending transversely therethrough in circumferentially spaced relation. These openings are adapted to receive therethrough a plurality of bolts 100 which are threaded into tapped openings 102 formed in the radial flange 104 of a valve housing designated, in general, by the reference numeral 106. The flanges 96 and 104 have interposed therebetween an annular gasket 108 formed of asbestos or other similar materials.

THE VALVE

As will be seen from the drawings, the flange 104 of the valve housing is spaced laterally and outwardly from the outer wall 110 of the housing, the valve housing being substantially hollow and having a rectangular configuration. The outer wall 110 is separated and is held in spaced relation with respect to the substantially circular inner wall 112 by means of a pair of oppositely disposed spaced and substantially parallel side walls 114, 116 which are integrally formed therewith. The lower ends of the side and end walls are closed by an integrally formed end wall 118.

The housing 106 is provided with a central body portion 120 integrally formed therewith which extends between the side walls 114, 116, and is positioned intermediate their respective ends. As is seen in FIGURES 15 and 16, the central body portion 120 is formed with a passage 122 which is coaxially aligned with the cylindrical conduit member 50 and is of the same diameter. The central body portion 120 divides the housing 106 in such a manner as to provide upper and lower cavities 124, 126, respectively.

A substantially rectangular gate valve 128 is mounted for vertical reciprocation through the central body portion between the arms 114, 116. As is seen in FIGURES 15 and 16, the gate valve 128 has a substantially solid upper end section 128A and is provided with an aperture 128B adjacent the lower end thereof of substantially the same diameter as the passage 122. One end of the valve operating rod 128C is integrally connected with the solid upper end portion 128A and projects upwardly through the cavity 124 through an opening 130 formed in the foot portion 132 of a substantially reversed C-shaped cap plate 134. An asbestos gasket 136 is interposed between the foot portion 132 and the upper end of the housing 106, and the latter is provided with a pair of laterally and outwardly extending flanges 114A, 116A integrally formed with the arms 114 and 116, respectively. The cap plate 134 is secured by bolts 138 to the flanges 114A, 116A, the bolts being threaded into the openings 114B and 116B, respectively. The opening 130 is enlarged to receive a chevron type gasket 140 and a steel fitting 142 through which the rod 128C extends.

The leg portion 144 of the cap 134 is integrally formed with a laterally extending enlarged boss 146 which is provided with a vertically extending passage 148 to receive the upper threaded end 128D of the rod 128C. A valve operating wheel 150 having an internally threaded hub 152 is mounted on the upper end 128D of the rod 128C. Thus it is seen that as the wheel 150 is rotated in a clockwise direction, the solid portion 128A of the gate valve 128 is moved upwardly into the cavity 124, and in so doing moves the apertured portion 128B thereof upwardly into coaxial alignment with the passage 122. The arrangement is such that the lower end portion 128E of the valve 128 is never drawn upwardly beyond the lower marginal edge 120A of the central body portion 120.

After the gate valve 128 has been elevated to its open position, counter-clockwise operation of the wheel 150 will lower the apertured portion 128B into the cavity 126, and the solid portion 128A thereof will move downwardly out of the cavity 124 to extend across the passage 122, the valve 128 now being returned to its normally closed position.

THE PREHEATING APPARATUS

An annular asbestos gasket 154 is interposed between the inner wall 112 of the housing 106 and one end of an elongated cylindrical conduit 156. This end of the conduit 156 is provided with a radially and outwardly extending flange 158, and the flange 158, gasket 154, and inner wall 112 of the housing 106 are connected together by means of a plurality of bolts 160. The other end of the cylindrical conduit 156 is also provided with a radially and outwardly extending flange 162 which is connected with the upper end of a cylindrical side wall 164 of a crucible 165 by bolts 166 (see FIGURE 2 of the drawings). A neoprene annular gasket 168 is interposed between the flange 162 and the adjacent portion of the cylindrical side wall 164.

A cylindrical core 170 formed of heat insulating material such as magnesium oxide is telescoped within the conduit 156. The inner circumference of the insulator 170 is formed with a helicoidal groove 172 in which is wound an electric resistance heating element 174, and the ends 174A (see FIGURE 15) and 174B (reference to FIGURE 2) thereof are connected to a suitable source of electrical energy in a manner to be described below. It should be noted that the insulator 170 extends from a point adjacent the flange 158 of the conduit 156 to a point inwardly of the cylindrical wall 164 of the crucible 165 and is suitably supported therein by means to be described.

One end of an elongated steel cylindrical pipe 176 is provided with an integrally formed outwardly extending radial flange 178 which is suitably apertured at spaced intervals 180 to permit the passage therethrough of a plurality of bolts 182 for threaded engagement within tapped openings 184 whereby the pipe is fixedly secured to the inner side 112 of the valve housing 106. The inside diameter of the pipe 176 is substantially the same as the passage 122 and the two are coaxially aligned.

Referring to FIGURE 15 of the drawings, it should be observed that the gasket 154 is extended for interpositioning between the adjacent sides of the flange 178 and the inner wall 112 of the valve housing. The pipe 176 is concentrically located with respect to the insulator 170 and is maintained in spaced relation relative thereto to provide a hollow annulus 186, and the other end thereof projects inwardly of the crucible 165 and terminates at a point beyond the insulator 170.

THE FIRST CRUCIBLE

The crucible 165 includes the steel cylindrical side wall 164, having an integrally formed bottom wall 188, the upper end of the crucible being open. The upper end of the crucible 165 is provided with an opening 190 which receives and supports therein the insulator 170. A second substantially circular opening 192 extends transversely through the side wall 164 adjacent the bottom wall 188 and is in vertical alignment with the opening 190.

A third opening 194 is formed in the side wall 164 diametrically across from the opening 192, the center point of the opening 194, however, being positioned slightly above the center point of the opening 192. A cylindrical shell 196 formed of a refractory oxide such as Transite (asbestos-cement material) having open upper and lower ends is telescoped within the side wall 164. The upper end of the Transite member terminates at a point adjacent to but spaced from the upper end of the side wall 164 while at points adjacent the lower end thereof the shell is apertured at 198 and 200 for coaxial alignment with the openings 192 and 194. The lower end of the shell rests on the crucible bottom wall 188.

The shell 196 is provided with a helicoidal groove 202 on the inner side thereof which extends intermediate the openings 190 and 198, 200, in which is laid or otherwise secured a hollow copper coil 204. One end 204A of the coil 204 extends outwardly through an opening 206 formed in the side wall 164 and through the gasket 208 and fitting 210 therefor and is connected with a source of water or other coolant. Lead 212 of one side of a high frequency alternating current source is connected to the exposed end 204A. The other end of the coil, 204B, extends through a similar opening 214 formed in the side wall 164, and gasket and fitting 216 and is connected to the water discharge system. This end of the pipe has fixedly secured thereto the other lead 218 of the high frequency alternating current source.

Figure 2:
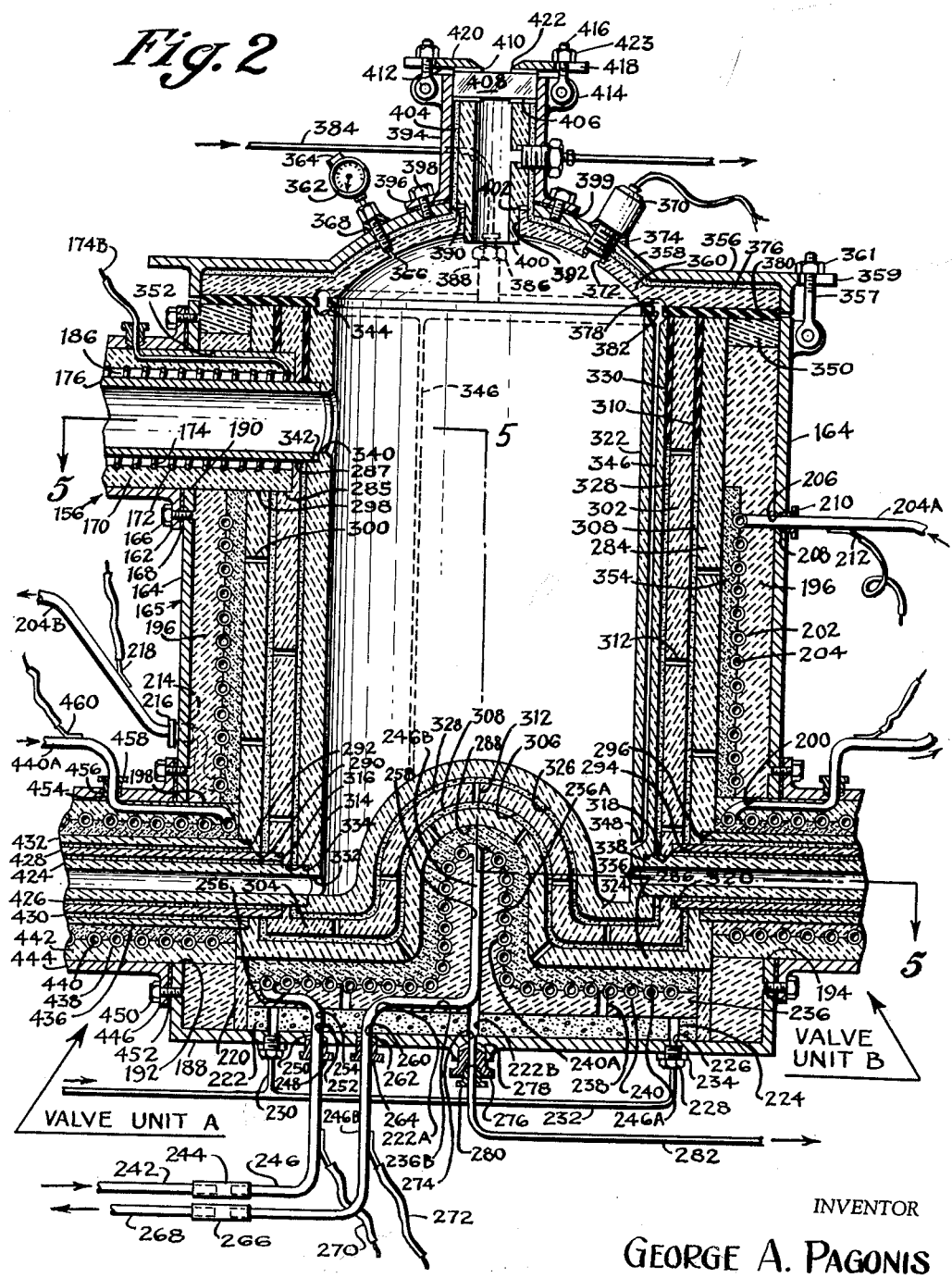
FIGURE 2 is a vertical cross-sectional view illustrating the construction of one of the crucibles employed.

A vertical elongated hollow cylindrical body 220 is telescoped within the lower end of the shell 196 and is also formed of a refractory oxide such as, for example, Transite, the body 220 being supported on the bottom wall 188. Within the cylindrical body 220 is telescoped a cylindrical disc 222 which is also supported on the bottom wall 188. As is seen in FIGURE 2, the disc 222 is provided with a plurality of transversely extending passageways 224 which register with ports 226 which are enlarged and tapped to receive fittings 228, the latter connecting the ports through branch pipes 230 with a main conduit 232 connected with a source of an inert gas such as helium, under pressure. Neoprene gaskets 234 may be used, if found necessary, to seal the fittings 228.

A second cylindrical disc 236 formed of a refractory oxide such as, for example, grog or Transite, is superposed on the soapstone disc 222 and is telescoped within the cylindrical body 220. The disc 236 is provided with a plurality of transversely extending passages 238. The disc 236 is integrally formed with a laterally extending substantially centrally positioned upwardly extending cylindrical boss 236A having an external helicoidal groove 240A formed therein which connects at its lower end with the innermost end of the groove 240.

A conduit 242 has one of its ends connected with a source of water under pressure while the other end thereof connects through a coupler 244 of conventional design with one end of a copper tubing 246 which extends through a fitting 248, gasket 250 and opening 252 formed in the bottom wall 188 and continues upwardly through the communicating passages 254, 256 formed in the discs 222 and 236, respectively, and is coiled at 246A in the grooves 240 and 240A. As is seen in FIGURE 2, the convolutions of the coil 246A spiral inwardly of the disc 236 and upwardly along the boss 236A and terminate in an end portion 246B which extends downwardly through a vertically extending centrally positioned bore 248 coaxially aligned with the boss 236A. The portion 246B then extends laterally through a passage 236B formed in the disc 236 and then downwardly through a connecting passage 222A which registers with a discharge port 260. The portion 246B extends through this port, the sealing gasket 262 and fitting 264 for connection with one end of a second conventional coupler 266 having its other end connected with the water discharge system through the conduit 268. Leads 270 and 272 connect the tubing 246, 246A and 246B with a high frequency alternating current source.

The bore 258 at its lower end is in open communication with the coaxially aligned passage 222B formed in the disc 222, and which connects through a discharge port 274, a fitting 276 sealed by gasket 278 and the reduced cap fitting 280 with one end of a pipe 282, the other end of which is connected with high vacuum means.

The exposed upper portions of the cylindrical disc 236 and of the convolutions 246A are encased in a layer of a refractory oxide, which extends thereacross and upwardly over the boss 236A. The refractory oxide has a transverse dimension equal to the distance between the upper surface of the disc 236 and the upper end of the cylindrical body 220.

An outer cylindrical element 284 is concentrically positioned within the crucible 165 and is formed of a refractory material such as, for example:

(1) 80% thorium dioxide, 10% yttrium trioxide, 10% zirconium dioxide;
(2) 90% thorium dioxide, 10% yttrium trioxide;
(3) 85% thorium dioxide, 10% hafnium dioxide, 5% yttrium trioxide;
(4) Carbon graphite which has been impregnated with 90% thorium, 10% hafnium which is then fired to a minimum temperature of 3000° F.

As is seen in FIGURE 2, the lower end of the element is provided with an integrally formed closure wall 286 having a centrally positioned inwardly and upwardly extending concave-convex socket 288 formed therein to receive the boss 236A together with its encasement of refractory oxide.

The element 284 adjacent the lower end thereof is provided with a transverse bore 290 and counter-bore 292 which are coaxially aligned with the opening 192. Diametrically across from this bore and counter-bore, the element 284 is provided with a second bore 294 and counter-bore 296 which are coaxially aligned with the opening 194. Vertically spaced from and aligned with the bore 290 and counter-bore 292, the element 284 is formed adjacent its upper end with a third bore 298.

A plurality of passages 300 extend through the cylindrical element 284, its closure wall 286, and socket portion 288.

The element 284 at its upper end terminates at a point spaced below the upper end of the side wall 164.

A second or intermediate substantially hollow cylindrical element 302 is concentrically positioned within the first element and is formed of any one of the above referred to refractory materials. As is seen in FIGURE 2, the second element is provided with an integrally formed closure wall 304 having a centrally positioned concave-convex inwardly extending portion 306 forming a socket in which is received the socket 288.

The first and second elements, 284 and 302, respectively, are held in spaced relation by a layer or lining 308 of molybdenum oxide, its dioxide or the trioxide thereof.

The second element, at its upper end, is flush with the upper end of the first element and the molybdenum oxide liner 308 terminates therebelow to provide space for neoprene sealing ring 310. This element is also provided with a plurality of transversely extending passages 312 formed therein as well as in its closed wall 304 and socket portion 306.

The lower end of the element 302 is provided with a bore 314 and counter-bore 316 which are aligned with the opening 192. Diametrically across therefrom and at a slightly higher elevation, the lower end of the element 302 is provided with a second bore 318 and counter-bore 320. This bore and its counter-bore are aligned with the opening 194.

The third or inner hollow cylindrical element 322 is disposed within the crucible 165 in concentric spaced relation relative to the first and second thereof. As in the preceding cases, the element 322 is formed of any one of the refractory materials referred to above, including its integrally formed base wall 324 and its concave-convex centrally positioned socket portion 326 which receives therein the socket portion 306 of the second or intermediate element.

The element 322 together with the second element 284 are held in spaced relation relative to the intermediate element 302 by a layer or liner 328 of molybdenum oxide, dioxide or the trioxide thereof.

The liner 328 terminates below the upper end of the element 322 which is flush with the upper end of the intermediate element 302 to provide an annular space which receives therein a sealing ring 330.

The lower end of the element 322 is provided with a bore 332 and counter-bore 334 which is coaxially aligned with the opening 192 and a diametrically opposed bore 336 and counter-bore 338, the center points of which are at a higher elevation than those of the former, and the bore 336 and counter-bore 338 are coaxially aligned with the opening 194.

The upper end of the element 322 is provided with a bore 340 and counter-bore 342 which is coaxially aligned with the opening 190.

A circumferential groove 344 extends around the upper end of the element 322 which is in open communication with the upper end of a plurality of longitudinally extending circumferentially spaced bores 346, the lower ends of which communicate with the upper inner end of inclined bores 348 having their respective lower ends in open communication with the interior of the element 322.

A plurality of heat insulation bricks 350 are disposed on the top of the cylindrical shell 196 with the upper end thereof flush with the upper ends of the three elements.

The crucible 165 is completed by forming an aperture or opening 352 in the Transite shell 196 and filling the space between the coil 204 and the adjacent element 284 with refractory oxide 354.

The upper end of the crucible 165 is provided with a disc shaped closure member 356 formed of steel and having a centrally disposed raised dome 358. The disc shaped closure member together with its dome has interfitted therein a liner 360 formed of one of the above referred to refractory materials used in any one of the elements 284, 302 or 322.

A pressure gage 362 having a pressure relief valve 364 associated therewith is threaded through the dome 358 and extends into communication with a port 366 formed in the refractory liner 360. A neoprene gasket 368 seals off the gage. A radiomatic temperature control 370 is mounted in the dome 358 and extends through the refractory liner 360 for communication with the port 372 formed therein, and the control 370 is sealed off by a neoprene gasket 374.

The refractory liner 360 is held in spaced relation relative to the closure member 256 by a layer or lining of grog material 376 and the liner 360 is also provided with a circumferential groove or channel 378 adapted to register with the groove 344. A gasket 380 formed of neoprene or of a silicon material is interposed between the refractory liner 360 and the upper ends of refractory materials and elements disposed within the crucible 165. At circumferentially spaced intervals, the gasket is provided with ports or slots 382 to connect the groove 344 with the groove 378 to form a closed passage. A source of helium or other inert gas under pressure is connected with one end of a steel pipe 384 while the other end thereof connects through a suitable fitting 386 with an inlet conduit 388 which is, in turn, connected with the groove 378.

The dome 358 and the refractory liner 360 are centrally apertured at 390 and 392, respectively, and these apertures are coaxially aligned with a sleeve 394 having a pair of opposed open ends. One end of the sleeve 394 is provided with a radially and outwardly extending flange 396 which is bolted at 398 to the dome 358. A neoprene gasket 399 is interposed between the sleeve 394 and the dome 358.

An elongated substantially hollow cylindrical member 400, formed of the refractory material of the three elements, is disposed within the sleeve 394 in spaced relation relative thereto, and is supported on a neoprene gasket 402 mounted on the refractory liner 360. As is seen in FIGURE 2, the member 400 extends through the refractory liner 360 and is held in spaced relation from the sleeve by a grog refractory 404. A neoprene gasket 406 extends across the upper ends of the grog liner 404 and the member 400 and receives thereon a circular glass window 408. A circular gasket 410 formed of neoprene material extends around the marginal edge of the window 408 and is interfitted within a larger gasket 412 which is mounted on the upper end of the sleeve 394.

The sleeve 394, adjacent the upper end thereof, is provided with a plurality of integrally formed lugs 414 each of which has pivotally mounted thereon a locking dog 416 which is adapted to pivot upwardly into radially extending slots 418 which extend radially inwardly from the circumference of a circular closure plate 420 positioned on the gaskets 410 and 412. The plate 420 is constructed with a sighting opening 422. Lock nuts 423 threaded on the dogs 416 hold the plate 420 firmly in place.

From FIGURE 2 it is seen that the substantially cylindrical magnesium oxide insulator member 170 extends through the openings 190, 352, the refractory bore 298 and is seated in the counter-bore 285 of the refractory element 284. The pipe 176 extends beyond the bore 287 and is coated in the counter-bore 342, the diameter of the pipe being substantially equal to the diameter of the bore 340.

The crucible 165 is connected with a dross mold to be described below.

THE MOLD

As is seen in the drawings, an elongated substantially hollow cylindrical member 424, provided with a pair of oppositely disposed open ends, has one of the ends thereof disposed within the counter-bore 334 formed in the refractory element 322. The internal diameter of the cylindrical member 424 is substantially equal to the diameter of the bore 332, and the cylindrical member 424 is preferably formed of the same refractory material as that of the element 322.

The cylindrical member 424 is surrounded by a layer or lining 426 of molybdenum oxide, dioxide or its trioxide and is encased by a second elongated substantially cylindrical member 428 having open ends preferably formed of the same material as the second or intermediate element 302. As is seen in FIGURE 2, one end of the elongated cylindrical member 428 is positioned within the counter-bore 316 formed in the intermediate refractory element 302. The cylindrical member 428 is, in turn, surrounded by another layer of molybdenum oxide, 430, its dioxide or trioxide and is encased within a third elongated substantially hollow tubular member 432 having a pair of opposed open ends. Again referring to FIGURE 2, it will be seen that one of the ends of the member 432 is received within the counter-bore 292 of the first of the refractory elements 284.

The tubular member 432 is surrounded by a liner 436 formed of refractory oxide, and the latter is encased in an elongated cylindrical member 442 formed of a refractory material such as Transite. The member 442 is provided with an axially extending helicoidal groove 438 in which is positioned the convolutions of a copper tube 440. It is seen that the refractory oxide 434 and the Transite cylinder 442 both extend through the opening 192 formed in the side wall 164 of the crucible 165 and terminate inwardly thereof at a point adjacent the outer extremity of the refractory cylindrical member 432.

An elongated tubular conduit 444 having opposed ends surrounds the heat insulator 442 and is provided with the radially and outwardly extending flanges 446, 448 at its opposed ends, respectively (see FIGURES 2 and 11). A plurality of circumferentially spaced bolts 450 secure the flange 446 to the side wall 164 of the crucible 165. The flange 446 and the side wall 164 have interposed therebetween a gasket 452 formed of neoprene.

One end of the copper tube 440 extends outwardly through an opening 454 formed in the tubular conduit 444, the opening 454 receiving the usual gasket 456 and fitting 458. A lead 460 from one side of a source of high frequency alternating current is fixedly secured to the end 440A of the tube 440, and the other end 440B thereof (see FIGURE 11) extends outwardly through an opening 462 formed in the tubular conduit 444 adjacent the other end thereof. As before, the opening 462 receives the usual gasket 464 and fitting 466. A lead 468 connects the copper tube 440 with the other side of the above mentioned source of high frequency alternating current.

As is seen in FIGURE 11, the cylindrical heat insulating member 442 and the refractory oxide liner 434 terminate adjacent the other end of the conduit 444. A sealing gasket 472 formed of neoprene or other similar materials extends across the flange 448 and is engaged at its opposite side by radial flange 474 of a metal discharge nozzle designated, in general, by the reference numeral 476. Bolts 478 and nuts 480 secure the flanges 448 and 474 together.

The discharge nozzle 476 is seen to comprise a substantially hollow cylindrical side wall 482 which is integrally formed with the flange 474 and with a bottom wall 484. An elongated substantially hollow tubular conduit 486 depends from the bottom wall 484 and is in open communication with the chamber 488 formed in the upper end of the nozzle 476. The side wall 482 is provided with a transversely extending opening 490 through which extend the refractory elements 424, 428 and 432 together with the adjacent portions of their respective molybdenum oxide liners.

The chamber 488 together with the tubular conduit 486 is occupied by a packing 492 in which is formed a downwardly extending passage 494 which opens, at its upper end, in a bore 496 extending inwardly from a side of the packing 492. The bore 496 is counter-bored at 498 and again at 500 in order to receive the staggered ends of the refractory elements 424, 428 and 432, respectively, therein.

A passage 502 is formed in the packing 492, the passage having one of its ends in open communication with the downwardly extending passage 494 and the other end of the passage 502 registers with a port 504 which receives a fitting 506 sealed by gasket 508 and connected with one end of a pipe 510 having its other end connected with a source of helium under pressure. A cover plate 512 extends across the open upper end of the chamber 488 and is secured to the upper end of the side wall 482 by means of bolts 514. The refractory packing 492 adjacent the lower end thereof is recessed at 516 and receives thereunder a substantially circular gasket 518 formed of neoprene. The gasket is supported upon the flange 520 which extends radially and inwardly from the lower end of the tubular conduit 486. The lower end of the downwardly extending passage 494 is provided with a counter-bore 522 which opens into the interior of a mold designated, in general, by the reference numeral 524.

A steel flange 526 surrounds the tubular conduit 486 and is slidably mounted thereon. The flange 526 is substantially annular in configuration, and the inner circumference thereof is provided with a recess 528 in which is disposed a gasket 530 formed of silicon.

The flange 526 has secured to the underside thereof a gasket 532 which is adapted to engage the upper arm 534 of a mold cap 536. The mold cap is provided with a pair of openings 538, 540 which are adapted to receive fittings 542 and 544, respectively, which are sealed thereto by gaskets 546. The fittings 542, 544 are set in at an angle in the flange portion 548 of the mold cap 536 and communicate at their inner ends with the inclined passages 550 and 552, respectively.

Referring to FIGURES 11, 12 and 14, it is seen that the mold cap 536 and the mold 524 are substantially circular in configuration. The upper end of the mold 524 is recessed to provide a shoulder 554 on which is disposed a circular gasket 556 formed of neoprene material. The mold 524 is provided with a centrally disposed substantially cylindrical chamber 558 of substantially conventional design. The cylindrical wall 560 of the mold 524 is formed of steel and has embedded therein an elongated helicoidal tubing 562 formed of copper which is tungsten metalized. One end 562A of the tubing 562 is connected with a source of fluid under pressure such as, for example, water or other coolant, and the other end 562B is connected with the water discharge system. A pair of diametrically opposed trunnions 564 are fixedly secured to the wall 560 of the mold 524.

For reasons which will be explained in detail below, the fitting 542 has connected thereto one end of a pipe 566 having its other end connected with a source of helium under pressure. The fitting 544 is connected with one end of a pipe 568 having a pressure relief valve 570 connected therein with a high vacuum source through the pipe 571.

The mold cap 536 is provided with a substantially rectangular slot 572 which extends inwardly from a side thereof in order to receive a valve plate or gate 574 which is adapted to extend across the central opening 576 formed in the mold cap 536. The mold 524, as illustrated in FIGURE 11, is shown in its operative position in connection with the crucible illustrated in FIGURE 2. The valve 574 has been opened to the position shown in FIGURE 14 and the tubular member 486 has passed therebelow.

When the mold 524 has been filled with molten material from the crucible illustrated in FIGURE 2, the mold together with its cap is lowered away from the tubular member 486 until the lower end thereof clears the upper side of the slot 572. At this time, the valve 574 is moved to its closed position completely sealing off the opening 576. At this time a substantially cylindrical cap 578 having a handle 580 is inserted over the lower end of the tubular member 486.

Prior to the removal of the mold 524 from the lower end of the tubular member 486, the flow of the metal through the passage 494 is cut off by valve means to be described below.

Attention is directed to FIGURE 13 of the drawings wherein a modified form of the mold 524 is illustrated. In the modification, reference numeral 582 designates, in general, the modified mold which is seen to comprise a pair of inner and outer cylindrical members 584, 586 having closed bottom ends 588 and 590, respectively. The cylindrical members 584, 586 are held in concentric spaced relationship by means of a liner 592 formed of a refractory oxide such as Transite and having an axially extending helicoidal groove 594 formed in the inner surface thereof to receive the convolutions 596 of a copper pipe 598. The opposed ends (not shown) of the pipe 598 are connected, respectively, with a source of fluid under pressure and a discharge system.

THE VALVE

As has been mentioned above, the valve is connected in the refractory member 424 through the conduit 444 intermediate the crucible 165 and the mold 524. The details of the valve construction are illustrated in FIGURES 6, 7 and 8 to which reference is now specifically made.

The valve, designated in general by the reference numeral 600, is seen to comprise a substantially hollow elongated substantially cylindrical tubular member 602 formed of any of the refractories mentioned above, the member 602 extending transversely across the inner and intermediate refractory elements 424 and 428. At its lower end, the member 602 is seated within a bore 604, and the member 602 is provided at its upper end with a flange 606 which seats on a circular shoulder 608 of the counter-bore 610. The member 602 is provided with a horizontal substantially cylindrical bore 612 which is of the same inside diameter as the inside diameter of the refractory element 424 and is coaxially aligned therewith. The member 602 is formed with a substantially rectangular axially extending passage 614 in which is mounted for reciprocation a gate valve 616 formed of any one of the above referred to refractory materials.

The gate 616, as illustrated in FIGURES 6 and 7, is shown in its closed position. By means to be described, the gate valve 616 is adapted to be elevated from the position shown in FIGURES 6 and 7 to effect alignment of a passage 618 with the opening formed in the refractory member 424. A steel grid 620 is embedded in the upper end of the gate valve 616 and is provided with an externally threaded extension 622 which is threaded in a cap 624.

The lower end 626 of a housing, referred to in general by the reference numeral 628, extends downwardly through the cylindrical conduit 444, the Transite insulator 442, and the refractory oxide 436, and is seated on the upper end of the flange 606. The lower end of the housing 626 is substantially hollow to permit reciprocation of the cap 624 therein.

As is seen in FIGURE 6 of the drawings, the cap 624 encloses an enlarged substantially cylindrical boss 630 integrally connected with the lower end of the valve stem 632 which is externally threaded at 634 for threaded engagement with the tapped opening 636 formed in the closed end wall 638 of the housing 628. The conduit 444 is provided with a raised boss 640 on which is positioned a flange 642 which extends radially and outwardly of the housing 628. The flange 642 is fixedly secured to the boss 640 by means of stud bolts 644. A gasket 646 is interposed between the flange 642 and the boss 640.

The housing 628 is provided with a substantially hollow upper section 648 which receives the upper end of the stem 632. As shown in FIGURES 6 and 7, the upper end of the stem 632 is encased in an elongated substantially hollow cylindrical sleeve 650 which is surrounded by a helicoidal length of copper tubing 652. The ends 652A and 652B are connected with a source of water pressure and with the water discharge system, respectively.

To serve a function which will be described in detail below, the upper end 648 of the housing has a transversely extending bore 654 formed therein which is connected through fitting 656 with a conduit 658 which is, in turn, connected with a source of helium under pressure.

The upper end of the housing 628 is formed with an integral flange 660 on which is positioned a gasket 662. A disc 664 is bolted at 666 over the gasket 662, the disc 664 having a hub 668 aperture at 670 to receive the upper end of the stem 632 therethrough. As in previous instances, the stem is enclosed within a gasket 672 and extends through a fitting 674. The upper end of the stem 632 is provided with a manually operated wheel 676 which is keyed at 678 thereto.

Again referring to FIGURES 6 and 7 of the drawings, it is seen that the copper tube 440 is extended longitudinally of the cylindrical member 442 to present a minimum area thereof to the lower end of the tubular member 602 in order to prevent heat damage thereto.

The above described valve apparatus bears the legend valve unit A and comprises but one of the valve units B, C, D and E, all of identical construction. The apparatus of these valve units all finding identical counter-parts will not be further described.

THE SECOND CRUCIBLE

The second crucible is quite similar to the first crucible hereinbefore described, and elements of the second crucible which find their counter-part in the first crucible may be distinguished therefrom by the elevation of their reference numerals and letters by one thousand.

Figure 3:
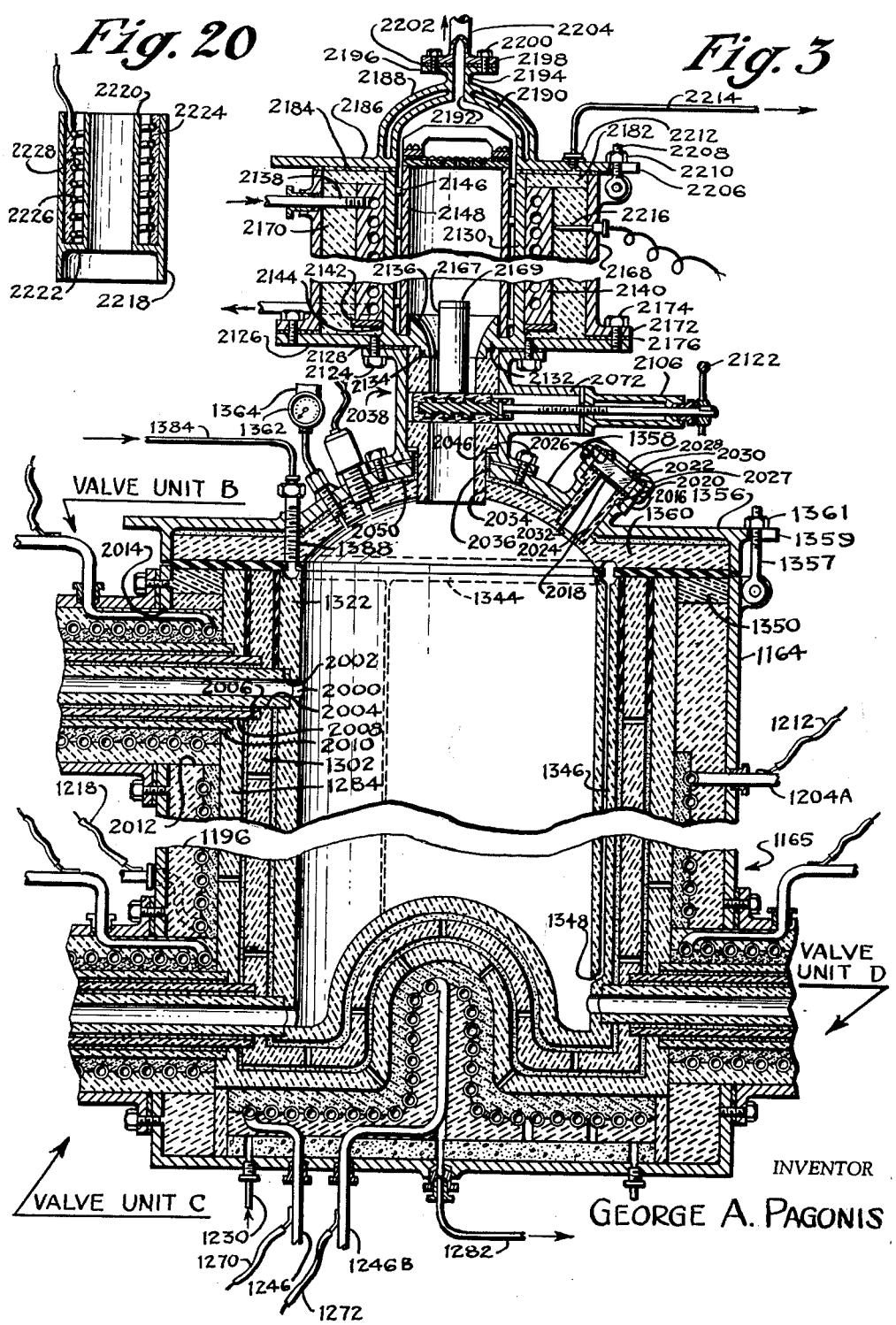
FIGURE 3 is a vertical cross-sectional view illustrating the construction of a second crucible constructed for use in the present invention.

Referring specifically to FIGURE 3 of the drawings, it will be seen that the inner refractory element 1322 is provided with a bore 2000 and is counter-bored at 2002. The second or intermediate refractory element 1302 is bored at 2004 and counter-bored at 2006. In a similar manner, the refractory element 1284 is bored at 2008 and counter-bored at 2010. Refractory oxide shell 1196 is bored at 2012, and the crucible wall 1164 is apertured at 2014.

The valve unit B connects the first crucible 165 with the second crucible 1165. As is seen in FIGURES 2 and 3 of the drawings, one end of the refractory member 424 seats in the counter-bore 338. One end of the refractory 428 is seated in the counter-bore 320 and one end of the refractory 332 is seated in the counter-bore 296. The other ends of these refractories are seated in the counter-bores 2002, 2006 and 2010 of the refractory 1165.

The closure member 1356 is constructed as described before with the exception of the provision of a window. As is illustrated in FIGURE 3, the closure member 1356 is provided with an integrally formed substantially hollow and externally threaded boss 2016 which receives therethrough a refractory liner or shell 2018 shouldered at 2020 for engagement and support on the boss 2016. A gasket 2022 is mounted on the shoulder 2020 and is covered by a window or glass 2024. A second gasket 2026 is positioned over the glass 2024 and the same are held in fixed relation by means of an internally threaded cap 2027 having a centrally disposed aperture 2028 formed in the end wall 2030 thereof. The shell 2018 extends downwardly through an opening 2032 formed in the refractory member 1360 and communicates with the interior of the crucible 1165.

The refractory 1360 is formed with a centrally positioned enlarged opening 2034 which registers with a centrally positioned opening 2036 formed in the dome 1358. A valve housing 2038 is mounted on the dome 1358 and is illustrated in enlarged detail in FIGURES 9 and 10. As shown therein, the housing 2038 is seen to comprise an elongated substantially cylindrical member 2040 having a pair of opposed radially and outwardly extending flanges 2042 and 2044 at its opposed ends. Bolts 2046 extend through the openings 2048 formed in the lowermost flange 2044 and are threaded into tapped openings which extend transversely through the dome 1358. A gasket 2050 formed of neoprene is interposed between the flange 2044 and the adjacent portion of the dome 1358.

The flange 2044 is integrally formed with a radially and inwardly extending flange 2052 on which is seated a gasket 2054. The gasket 2054 may be made of neoprene or other similar materials. An elongated substantially hollow cylindrical shell 2056 is disposed within the cylindrical member 2040 and is formed with a substantially cylidnrical bore 2058 and counter-bore 2060 at its upper end. The lower end of the shell 2056 is reduced in diameter at 2062 to provide an external radially extending shoulder 2064. As is seen in FIGURE 10 of the drawings, the shoulder 2064 is seated upon the gasket 2054.

Intermediate the top and bottom ends of the cylindrical member 2040, the latter is provided with a pair of spaced parallel substantially rectangular side members 2066, 2068 which communicate through a substantially rectangular opening 2070 with the interior of the member 2040. The side members 2066, 2068 are integrally formed with top and bottom members 2072 and 2074, respectively. A substantially rectangular opening 2076 is formed in the refractory 2056 and is in horizontal alignment with the opening 2070.

Figure 9:
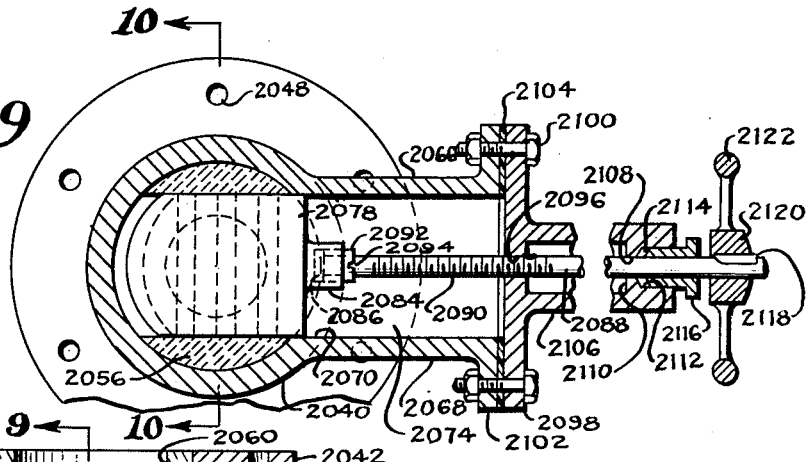
FIGURE 9 is a vertical cross-sectional view taken on the vertical plane of line 9—9 of FIGURE 10, looking in the direction of the arrows, and illustrating the details of the valves employed between the crucibles and the ingot molds as is illustrated in FIGURE 11.
Figure 10:
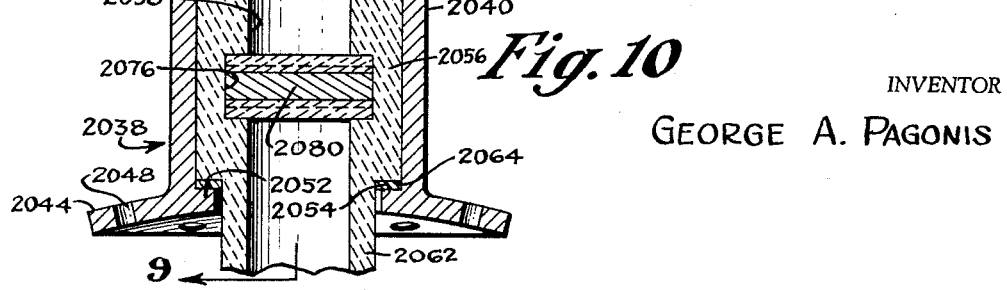
FIGURE 10 is a vertical cross-sectional view taken on the vertical plane of the line 10—10 of FIGURE 9, looking in the direction of the arrows.

As seen in FIGURES 3, 9 and 10, a substantially rectangular gate valve 2078 is mounted for reciprocation in the opening 2076 and in the cavity formed by the side members 2066, 2068 and the top and bottom members 2072 and 2074. The gate valve 2078 is formed of a refractory material in which has been embedded a grid 2080 formed of steel or other similar materials, the outer end of the grid having fixedly secured thereto an enlarged substantially hollow cylindrical boss 2084. The boss 2084 receives therein the enlarged radially extending flange 2086 integrally formed on one end of a valve stem 2088 having an intermediate portion thereof threaded at 2090. The valve stem 2088 is connected to the boss 2084 by means of the externally threaded bushing 2092 having a diametrically extending tool receiving recess 2094.

The valve stem 2088 is threaded in an opening 2096 formed in a cap plate 2098 which is, in turn, bolted at 2100 to a substantially circular radially outwardly extending flange 2102 formed on the outer end of the side members 2066, 2068 and the top and bottom members 2072, 2074. As in previous cases a neoprene gasket 2104 is interposed between the flange 2102 and the cap plate 2098.

The cap plate 2098 is integrally formed with a laterally extending substantially hollow cylindrical casing 2106 which surrounds the outer end of the stem 2088 and is provided with an opening 2108 formed in an intermediate wall 2110. The opening 2108 is enlarged at 2112 to receive the usual chevron gasket 2114 and fitting 2116. The extreme outer end of the valve stem 2088 is keyed at 2118 to the hub 2120 of a manually operated valve wheel 2122.

Bolts 2124 extend through the flange 2042 and are threaded into an enlarged disc 2126 which is separated therefrom by means of the neoprene gasket 2128. A substantially cylindrical housing 2130 is integrally formed with the disc 2126 and is coaxially aligned with the refractory shell 2056.

A flange 2132 extends inwardly of the housing 2130 and has a downwardly depending lip 2134 which is adapted to seat within the counterbore 2060 of the refractory member 2056. The lip 2134 is integrally formed with a second upwardly flared lip 2136 which extends above the disc 2126. A copper coil or tubing 2138 is cast within an aluminum cylinder 2140, the upper end of the tubing 2138 being secured to a source of water or other coolant under pressure. The lower end of the tubing 2138 is connected, as before, with the water or coolant discharge system. The aluminum cylinder is supported in position encircling the housing 2130 by means of a steel plate 2142 which is welded at 2144 to the housing 2130.

Lugs 2146 are integrally formed with or otherwise secured to the housing 2130 in vertical spaced relationship. The lugs 2146 are adapted to serve as guide and spacer means for a condenser envelope or shield 2148 having an elongated substantially hollow cylindrical configuration.

The condenser 2148 is shown in its exploded configuration in FIGURE 19 of the drawings. As illustrated therein the upper end of the condenser 2148 is provided with a plurality of circumferentially spaced tapped openings 2150 over which is disposed a substantially cylindrical disc 2152 having bolt holes 2154 extending transversely therethrough. The disc 2152 is provided with a plurality of transversely extending apertures or perforations 2156. The disc 2152 is covered by a wire mesh member 2158 over which is superimposed an annular element 2160 having a plurality of circumferentially spaced transversely extending bolt holes 2162 formed therein. Integrally formed with the annular element 2160 is a vertically extending handle member 2164. A plurality of bolts 2166 extend transversely through the opening 2162 formed in the annular element 2160 and passes through interstices formed in the fine wire mesh member 2158, the opening 2154 and are threaded into the tapped opening 2150.

A housing 2168 having a substantially hollow cylindrical configuration surrounds the cylinder 2140 in spaced relation relative thereto. The intervening space between the cylinder 2140 and the casing 2168 is filled with a refractory material such as grog 2170.

As is seen in FIGURE 3 of the drawings, the lower end of the casing 2168 is provided with a radially and outwardly extending flange 2172 which is bolted at 2174 to the disc 2126. The flange and the disc are separated, as before, by a neoprene gasket 2176.

The casing 2168 is provided with upper and lower apertures which receive therethrough the upper and lower ends of the copper tubing 2138. These openings as well as other openings through casing members to be described in the future, will be understood to be sealed by means of the gasket and fitting arrangement illustrated in FIGURE 24. As illustrated therein, the opening Z formed in the metallic member will always be sealed by means of a chevron type gasket 2178 and will be maintained in sealed engagement against the pipe or tubing Y by means of an externally threaded fitting 2180.

The upper end of the aluminum cylinder 2140 and the adjacent upper end of the refractory material 2170 are covered by an anular layer of an insulating refractory 2182 having a high permeability such as, soapstone. The gasket 2184 is interposed between the upper end of the casing 2168, the soapstone refractory 2182 and the adjacent end of the housing 2130.

A closure member 2186 having a substantially circular configuration and a dome shaped central portion 2188 is superposed over the gasket 2184. The dome 2188 is provided with an integrally formed liner 2190 which is held in spaced relation relative thereto. The upper end of the liner and dome are provided with a central passage 2192 which communicates with a substantially hollow cylindrical boss 2194 which projects upwardly from the dome 2188 and terminates in a substantially radially and outwardly extending flange 2196. A radial flange 2198 is bolted to the flange 2196 by stud bolts 2200.

As in the previous cases, the two flanges are separated by a liner 2202 formed of neoprene or other similar materials. The flange is integrally formed with one end of a substantially tubular conduit 2204 which is connected with a high vacuum source.

The closure member 2186 is provided with a plurality of radially extending slots 2206 which extend inwardly from the circumference thereof and are adapted to receive the dogs 2208 on which are mounted nuts 2210 whereby the closure member 2186 may be firmly locked and sealed against the gasket 2184. The closure member 2186 is also tapped to receive a fitting 2212 which is connected through a conduit 2214 with a source of vacuum. A thermocouple 2216 extends through the casing 2168 and engages the cylindrical member 2140 whereby the temperature of the latter may be quickly and easily ascertained.

Under some circumstances which will be described below, the condenser 2148 is removed and the device illustrated in FIGURE 20 is substituted therefor. As illustrated, the substitute member comprises an elongated substantially hollow steel casing 2218 integrally formed with a concentrically positioned coaxially extending cylindrical member 2220 by means of a bottom wall 2222. A refractory shell 2224 having a helicoidal groove 2226 extending axially thereof is telescoped within the casing 2218, an electrical resistance element 2228 being disposed within the spiral groove.

Valve unit C connects the lower end of the crucible 1165 with a second mold of the type illustrated in FIGURES 11, 12, 13 and 14.

Figure 4:
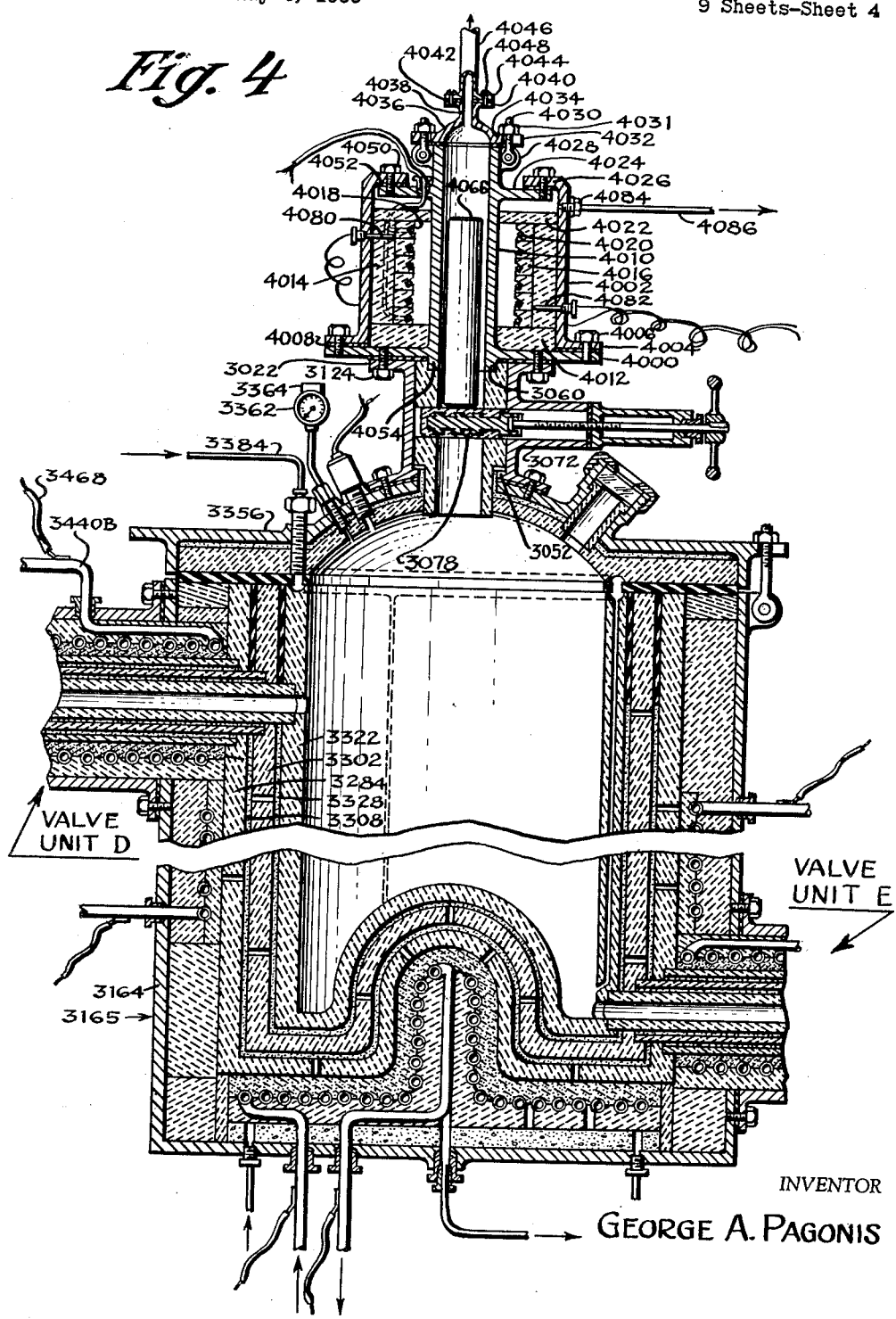
FIGURE 4 is a vertical cross-sectional view illustrating the construction and assembly of a third crucible constructed in accordance with this invention.
Figure 5:
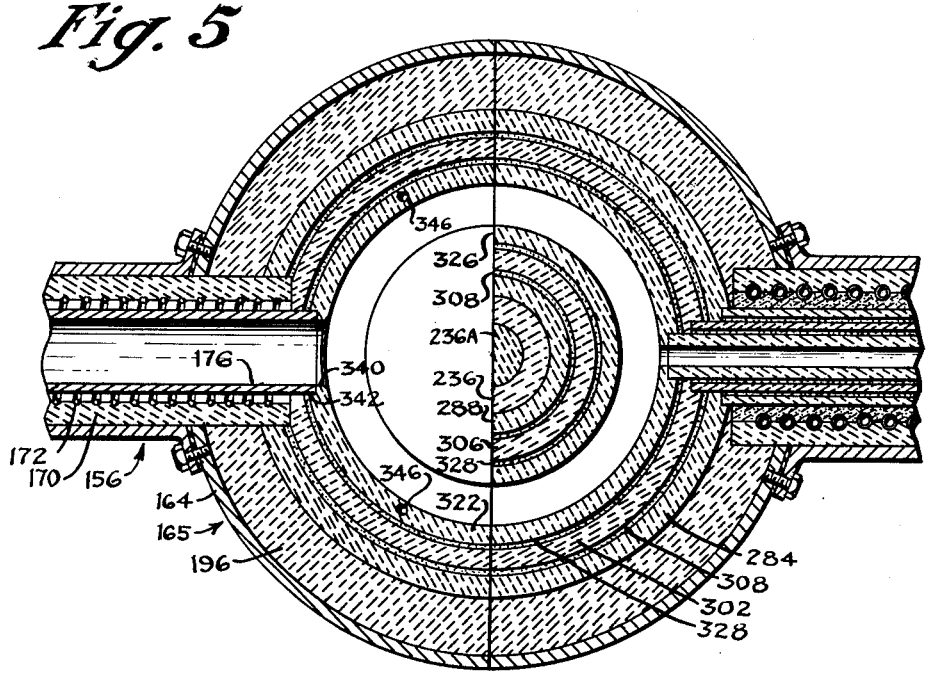
FIGURE 5 is a horizontal cross-sectional view taken on the line 5—5 of FIGURE 2, looking in the direction of the arrows.

Valve unit D connects the crucible 1165 with the upper end of the crucible 3165 comprising the third crucible of the apparatus illustrated in FIGURE 4 of the drawings.

THE THIRD CRUCIBLE

With the exception of but a part of the crucible illustrated in FIGURE 3, the crucible of FIGURE 4 is identical in construction. Consequently, elements illustrated in FIGURE 4 which find their counter-part in FIGURE 3 may be distinguished therefrom by the raising of the reference numerals by one thousand.

The only change that is made between the crucibles of FIGURES 3 and 4 involves that part of the apparatus which is positioned above the horizontal gate mounted on the dome of the crucibles.

In the crucible illustrated in FIGURE 4, the upper flange 3022 of the horizontal gate valve 3078 is bolted at 3124 to a substantially circular disc 4000. A substantially cylindrical steel casing 4002 having a pair of opposed open ends is positioned above the disc 4000. As is seen in FIGURE 4 of the drawings, the housing 4002 is provided with a radially and outwardly extending lower flange 4004 which is fixedly secured to the disc 4000 by bolts 4006. As in the previous cases, the flange 4004 has a neoprene gasket 4008 interposed between it and adjacent portions of the disc 4000. A substantially hollow elongated cylinder 4010 projects upwardly from the disc 4000 and is integrally formed therewith. The lower end of the cylinder 4010 is surrounded by an annular ring 4012 of fused magnesium oxide, and the annular member rests upon the upper side of disc 4000.

A core 4014 formed of Transite material is telescoped within the housing 4002 and is supported on the annular member 4012. A plurality of heat insulating brick 4016 are disposed in a ring surrounding the cylindrical member 4010 in circumferentially spaced relation thereto. The innermost side of the brick 4016 is provided with a helicoidal groove 4018 in which is disposed a resistance heating element 4020. The upper ends of the insulating brick 4016 and the Transite 4014 are flush with each other and are covered by an annular member 4022 formed of soapstone or other materials having a high permeability.

The cylindrical member 4010 has a radially and outwardly extending flange 4024 adjacent the upper end thereof over which is superimposed a flange 4026 integrally formed with the housing 4002. The upper end of the cylindrical member 4010 is provided with a plurality of circumferentially spaced lugs 4028 on which are pivotally mounted a plurality of dogs 4030 which are adapted to be swung upwardly into engagement with slots 4032 which extend radially and inwardly from the circumference of a closure member 4034. The closure member 4034 is domed at 4036 and provided with a reduced neck extension 4038 which terminates in a radically and outwardly extending flange 4040.

A gasket 4042 is superimposed on the flange 4040, and the latter is abutted by a flange 4044 integrally formed with a vacuum pipe 4046. The assembly is retained in fixed position by means of a plurality of bolts 4048 which extend through the flange 4044 and the gasket 4042 for threaded engagement with the flange 4040. The closure member 4034 is retained in the position shown by means of the dogs 4030 and the nuts 4031.

Bolts 4050 extend through the flange 4026 and a gasket 4052 for threaded engagement with the flange 4024. A depending boss 4054 integrally formed with the disc 4000 is seated within the counter-bore 3060 formed in the upper end of the substantially cylindrical refractory member 3056.

A cartridge 4066 is disposed within the cylindrical member 4010 with the lower end thereof normally engaging against the gate valve 3078. A pair of upper and lower thermocouples 4080 and 4082, respectively, extend through the housing 4002 and engage against the brick 4016. A fitting 4084 connects the conduit 4086 with a high vacuum source.

THE MODIFIED CRUCIBLE

FIGURE 21 illustrates a modified form of the crucible. As illustrated therein the crucible designated, in general, by the reference numeral 5000 comprises an outer hollow cylindrical member 5002 having an integrally formed bottom wall 5004. A ring 5006 formed of an insulating material, such as fused magnesium oxide, is telescoped within the cylindrical side wall 5002 and rests upon the bottom wall 5004. A substantially hollow cylindrical shell 5008 formed of Transite is telescoped within the cylindrical wall 5002 and rests upon the ring 5006. The shell 5008 is apertured at 5010, the aperture 5010 being coaxially aligned with an aperture 5012 formed in the cylindrical member 5002.

A disc 5014 formed of soapstone is telescoped within the ring of fused magnesium oxide 5006 and rests upon the bottom wall 5004 of the crucible 5000. As is illustrated in FIGURE 21 of the drawings, the upper side of the soapstone disc 5014 is provided with a centrally positioned semi-spherical depression 5016. A layer of grog material 5018 is supported on the soapstonee disc 5014, the layer of grog material following the contour of the upper side of the disc 5014. As illustrated in FIGURE 21, the upper side of the grog layer 5018 is formed with a helicoidal groove 5020 in which is laid a substantially hollow copper tubing 5022.

A layer of norblack 5024 is superimposed over the tubing 5022 and the grog 5018, the norblack following the contour of the upper side of the grog material 5018. A ring 5026 formed of Transite material is positioned in a circumferential groove 5028 formed in the norblack material 5024, the ring being provided with a plurality of openings 5030 which receive the necked-down portion 5032 of an elongated vertically extending cylindrical standard 5034.

As seen in FIGURE 21 of the drawings, the standard 5034 extends through a transversely extending passage 5036 formed in the norblack 5024, the transversely extending passage 5038 formed in the grog material 5018 and the passage 5040 formed in the soapstone disc 5014. The standard 5034 projects outwardly and downwardly from the bottom wall 5004 of the crucible 5000 through an enlarged substantially hollow internally threaded boss 5042. The outer end of the boss 5042 is sealed by a gasket 5044 and the standards 5034 are held in adjusted relation by means of the nuts 5046 which are threaded on the exposed outer ends of the standards 5034.

A hollow cylindrical refractory element 5048 having a bottom wall 5050 integrally formed therewith is supported upon the upper side of the Transite ring 5026 and the refractory oxide 5024. The bottom wall 5050 is seen to follow the configuration of the upper side of these elements. The refractory element 5048 is seen to be spaced from the Transite member 5008 and this space is filled with refractory oxide 5052. An inner refractory element 5054 is disposed concentrically within the refractory element 5048 and is provided with an integrally formed bottom wall 5056. The bottom wall 5056 of the inner refractory 5054 follows the contour of the bottom wall 5050. The refractory element 5054 is spaced from the refractory element 5048 by a layer of molybdenum oxide, dioxide or trioxide 5058.

As in the case of the previously discussed crucibles the innermost of the refractory elements 5054 are provided with a plurality of longitudinally extending passages 5060 which are connected at their upper ends with a source of helium under pressure. The passages 5060 communicate at their lower ends with a horizontally extending passage 5062 and discharge through ports 5064 in the concave base 5066 of the bottom wall 5056.

Adjacent the upper end of the crucible 5000, the refractory element 5048 is provided with a bore 5068 and a counter-bore 5070. The refractory element 5054 is bored at 5072 and counter-bored at 5074. The bore and counter-bore 5072, 5074 are coaxially aligned with the bore 5068 and the counter-bore 5070.

The valve units F and G illustrated in FIGURE 21 are identically constructed with respect to the valve units A, B, C, D and E disclosed above, with the exception that the valve units F and G employ one less refractory member. As illustrated in the drawings, the valve units F and G are seen to comprise an elongated substantially hollow tubular conduit 5076 having a pair of opposed open ends. One end of the valve units F and G is provided with an outwardly and radially extending flange 5078 which is integrally formed therewith and is bolted at 5080 to the crucible wall 5002. A neoprene gasket 5082 is interposed therebetween.

An elongated tubular member 5084 formed of Transite is telescoped within the conduit 5076, and has mounted therein a copper coil 5088. Refractory oxide 5086 encases an elongated tubular refractory element 5090 which is spaced from a second elongated tubular refractory member 5092 by a layer of molybdenum oxide, dioxide, or its trioxide 5094. The tubing 5088 connects through its end 5088A with a water discharge system, while the other end thereof (not shown) is connected with a source of water or other coolant under pressure. The valve of each of the valve units F and G is identical to the valves of the units A, B, C, D and E.

The outer end of the Transite member 5084 extends through the opening 5010 in abutting relationship relative to the refractory element 5048. The outer end of the refractory element 5090 is seated in the counter-bore 5070 and the centrally disposed refractory element 5092 is seated in the counter-bore 5074 in coaxial alignment with the bore 5072. The construction and connection of the valve unit G at the discharge end of the crucible 5000 is identical to that previously described, and a reiteration thereof will not be made at this point.

The discharge valve unit G may be connected with a second crucible identically constructed with respect to the crucible 5000, or it may be connected with a mold designated, in general, by the reference numeral 5096. As seen in FIGURE 22, the other end of the conduit 5076 of the valve unit G is provided with a radially and outwardly extending flange 5098 which is connected by bolts 5100 with a radial flange 5102 of a housing designated, in general, by the reference numeral 5104. The flanges 5098 and 5102 are separated by a gasket 5106 formed of neoprene or other similar material.

Housing 5104 includes a radial flange 5108 integrally formed with the flange 5102 to which is bolted at 5110 a flange 5112 of a dome-shaped cover 5114. An elongated tubular conduit 5116 depends from the flange 5108 and the conduit and the housing is provided with a refractory member 5118 in which is inserted the outer ends of the refractory elements 5090 and 5092. The ends of the refractory elements 5090 and 5092 are sealed by a refractory cement 5120 and 5122. The refractory member 5118 is provided with a passage 5124 which extends downwardly through the tubular conduit 5116. The refractory 5118 is also provided with a passage 5126 which connects through a fitting 5128 with one end of a tube or pipe 5130 connected with a source of helium under pressure.

In its operative position, the depending tubular member 5116 receives a flange 5132 which is slidably mounted thereon and sealed by a gasket 5134 thereto. The underside of the flange 5132 has cemented thereto a neoprene gasket 5136 which normally engages the upper end of the mold cover 5138. The mold cover 5138 is connected through a pipe 5140 and valve 5142 with a source of helium or other inert gas under pressure by means of the fitting 5144 and tubular passage 5146. The cover also connects through a tube 5148 and two-way valve 5150 with a source of vacuum 5152 or pipe 5154 with the recovery side of the helium supply. Fitting 5156 and passage 5158 connect the pipe 5148 with the interior of the mold 5096, the usual neoprene gasket 5160 is interposed between the mold 5096 and the cover 5138. Coolant is supplied to the mold through the tubing 5162 connected with a source of water or other similar liquids through the conduit 5164. It will be recognized that the mold 5096, the cap 5138, and its associated elements, including the valve 5166, are identical in construction and function as is the mold illustrated in FIGURES 11 and 14 of the above described apparatus.

Leads 5168 and 5170 connect the tube 5088 with a source of alternating current, and similar leads 5172 and 5174 also connect the tube 5022 with a source of alternating current.

Pipe 5176 has one of its ends connected with a vacuum source through a two-way valve 5177, while the other end thereof connects through a fitting 5178 and port 5180 formed in the bottom wall 5004 with a passage 5182 formed in the soapstone disc 5014. One end of the pipe 5184 is connected with a source of helium under pressure and connects with a port 5186 through fitting 5188 with a passage 5190 which also extends through the soapstone disc 5014.

An arcuately-shaped bar 5092 supports the depressed dome 5050A of the bottom wall 5050 by means of the standard 5194 which extends downwardly therefrom and through a boss 5196 for threaded engagement with a nut 5198. The boss 5196 includes a gasket 5200.

*Operation of the Apparatus*

To effect a complete understanding of this invention, the function and operation of the component parts thereof will now be completely described. It should be carefully noted that if the apparatus is operated in accordance with the method of this invention the apparatus will continuously produce ingots, billets and castings of extreme purity and of constant homogeneous uniformity and grain refinement. It will also be found through the practice of this invention that titanium alloys produced thereby will be characterized by improved mechanical, physical and chemical properties. The improvement achieved in producing ingots, billets and castings prepared according to this method will be found far superior than the prior art counter-parts thereof.

For the purpose of illustration, it will be assumed that the equipment has been set up in the manner described hereinbefore, and one complete cycle of the operation of this apparatus will now be described.

The crucible 165 has the closure member 356 thereof removed and the crucible 165 is then filled substantially to the opening or bore 340 with commercially pure titanium sponge or an ingot thereof. It is a well known fact that commercially pure titanium bears with it certain undesirable elements of varying percentages. These elements generally comprise oxygen, nitrogen, carbon and iron. In this example of operation, let it be assumed that the commercially pure titanium employed has an oxygen content of 0.20%, a nitrogen content of 0.39%, a carbon content of 0.064%, and an iron content of 0.12%. The tested Brinell hardness was 269.

The closure member 356 is now replaced and the dogs 357 are swung into place in the slots 359 formed in its marginal edge. The nuts 361 are then tightened down to completely seal the crucible 165.

The valve 2078 of the crucible 1165 is moved to its closed position, the dome or closure member 2186 is removed, and the condenser sleeve 2148 is removed from the upper end of the crucible 1165.

A cartridge 2167 (see FIGURE 23) containing and formed of predetermined amounts of scavenger or improver materials is now seated on the valve 2078. The condenser sleeve 2148 is now replaced in the position shown in FIGURE 3, and the closure member 2186 is now tightly locked on the dogs 2208 and the nuts 2210.

The valve 3078 of the crucible 3165 is moved to its closed position as illustrated in FIGURE 4 of the drawings, and the closure cap or dome 4034 is removed to permit the insertion of a cartridge 4066 which is formed of predetermined values of alloying materials. The cartridge 4066 is seated on the valve 3078 and the closure member 4034 is then sealed to the upper end of the casing by means of dogs 4030.

At this point it would be advantageous to specify with particularity the compositions of the scavenger or improver materials and the alloying materials for use in treating commercially pure titanium of the type described above. It has been found that the scavenger materials may comprise the following, the percentages being given by weight:

| | Percent |
|---|---|
| Lithium | 50 |
| Silicon | 50 |
| Magnesium | 95 |
| Cerium | 5 |
| Metallic calcium | |
| Potassium permanganate | |

The lithium and silicon are alloyed in equal parts of each of the metals, the metals being mixed together and melted to form the alloy which will be employed as one of the scavenger agents. In a similar manner, the magnesium and the cerium are alloyed, 95% of the alloy comprising pure magnesium as a base, and 5% thereof the cerium being used as the alloying material. Other scavengers or improvers are potassium permanganate and metallic calcium. The cartridge 2167 and its cover 2169 are formed of metallic manganese.

All of the above mentioned scavenger and improver metals should be in their purest form, and the elements confined within the cartridge 2167 should be in their granulated form. The contained materials referred to above appear in the following quantities:

| | Percent |
|---|---|
| Lithium silicon alloy | 0.25 |

|                                                    | Percent |
| -------------------------------------------------- | ------- |
| Magnesium cerium alloy                             | 0.42    |
| Calcium                                            | 0.08    |
| Potassium permanganate                             | 0.50    |
| Manganese cartridge of the weight of the metal in the crucible 165 | 1.50    |

The alloying cartridge 4066 is formed of chrome and encloses alloying elements of molybdenum and iron. The enclosed or encased materials comprise 2.10% molybdenum and 2.0% iron. The chrome cartridge 4066, including its cover is 2.06% of the weight of the melt.

The valves of the valve units A, B, C, D and E, together with the valve 128, are now moved to their closed position.

The closure member 70 is now removed from the conduit 50 and the conduit 50 is filled with a charge of the titanium material which is of the same composition as the material within the crucible 165. The cover 70 is now replaced and locked by the wing nuts 82 against the gasket 83.

All of the apparatus, including the molds, is now connected with a high vacuum source. Thereafter, the vacuum is trned off from the crucibles, the molds and the preheating furnace and helium is then supplied thereto, the helium being first passed through a helium purifier 6000. The purifier 6000 is of conventional design and construction. For the optimum operating conditions, the helium should be passed through the apparatus at a pressure of substantially three to five pounds per square inch. The heating elements of the preheating apparatus 156 and the crucibles 165, 1165 and 3165 are now energized, and the preheating apparatus is heated to a temperature of 1900° F.; the first of the three crucibles, as is illustrated in FIGURE 2 of the drawings, is heated to a temperature of 3240° F., the melting temperature of titanium; the crucible illustrated in FIGURE 3 of the drawings is heated to 3000° F.; and the crucible illustrated in FIGURE 4 of the drawings is heated to 3000° F.

It is to be understood that all of the refractories of the preheating apparatus and the crucibles are thoroughly heliumized.

With the apparatus so conditioned, the valve 128 is opened and the ram head 66 is actuated by the hydraulic jack 30 to force a first charge of titanium into the preheating apparatus. The valve 128 is closed and immediately thereafter a second charge of the titanium metal is placed within the charging conduit 50 and the closure member 70 is again resealed in its respective position. Vacuum is again applied to the charging conduit 50.

At this point it is well to note that vacuum is employed in conjunction with the charging conduit in order to remove the ambient atmosphere therefrom, as well as to draw from the metal any loose dross or contaminants that may adhere to the titanium charge.

The titanium metal in the crucible 165 is brought to its molten stage and the operator may observe the condition of the melt at any time through the window 408. The temperature of the metal melt being very critical, it is carefully controlled by the radiomatic device 370 in order to preclude the inadvertent or accidental overheating thereof. When the metal reaches the critical temperature of 3240° F., the valve 128 is elevated to bring its aperture or opening 122 into alignment with the charging cylinder 50 and the preheating apparatus and the hydraulic jack 30 is then actuated to move from the position shown in FIGURE 15 toward the right of the conduit 50 and in so moving forces the second charge against the first charge disposed in the preheating chamber, causing the first charge to be ejected through the port or bore 340 and to fall into the crucible 165. The valve 128 is then moved to its lowermost or closed position and subsequently the closure member 70 is again removed in order that a third charge may be placed in the conduit 50. As before, the charging conduit 50 is again placed under a vacuum for the purpose and reasons heretofore described.

Assuming that a desired quantity of metal has now been melted in the crucible 165, the valve of the valve unit B is now opened to permit the metal to pass through the opening 366 and the refractory 424 and to discharge into the upper end of the crucible 1165 illustrated in FIGURE 3 of the drawings, through the opening 2000.

As has been previously mentioned, this crucible 1165 has been preheated to a temperature of 3000° F. The metal discharged through the port 2000 substantially fills the crucible 1165. At this time the valve of the valve unit B is moved to its closed position. The crucible 165 is recharged with additional material from the charging conduit 50 and the preheating chamber 156 until it has been refilled.

The crucible 1165 with its charge now standing at 3000° F. is supplied with helium under pressure which is discharged through the conduits 1346 and 1348, the helium effecting an agitation action through the molten melt. The condenser 2148, by heat of conduction, has been elevated at this time to a temperature of substantially 1000° F.

The helium which is passed directly to the interior of the crucible 1165 through the aforementioned passages is now turned down to a minimum pressure, while the helium under pressure at other points throughout the furnace is completely cut off. The conduit 1282 is now connected with a source of high vacuum, and the valve 2078 is then cracked slightly.

The helium is permitted to bubble through the melt for a period of approximately three minutes, and the vacuum within the casing 2130 of the crucible 1165 is measured by conventional monometer (not shown) and brought down to 0.10 mm. of mercury. The valve 2078 is then completely opened to permit the cartridge 2167 and its cap 2169 to drop into the crucible 1165. The scavengers now enact with the titanium melt and effect the following action.

When the cartridge 2167, and its cap 2169, are released, they drop downwardly through the mass of molten titanium and come to rest at the bottom of the crucible wall 1326. The cartridge becomes consumed under the melt and gases are released from the scavenger or improver elements which permeate the mass of molten titanium. The scavenger or improver elements combine with or entrain with the carbon, nitrogen, oxygen at the surface of the melt and are picked up by the high vacuum connected with the pipe 2204, and these are condensed on the inner wall of the condenser 2148. The coolant in tubing 2138 effects the crystallization of some of the sublimating elements while the vapor molecules are exhausted to the atmosphere.

After this operation has taken place, the valve 2078 is closed and the furnace vacuum to the pipe 1282 at the bottom of the crucible 1165 is cut off and the helium supplied through pipes 1230 at the base thereof is turned on and brought up to about three pounds pressure, while the helium to the interior of the crucible through the passages 1346 and 1348 is completely shut off.

The metal is then permitted to rest from five to eight minutes, at which time the now purified titanium metal may be drawn off to a third crucible 3165 for further metallurgical treatment or sampling.

The valve of the valve unit D is now open to transfer the purified molten titanium to the crucible 3165. With this accomplished, the valve of the valve unit D is again closed, sealing off the crucibles 1165 and 3165. The dross or residue material remaining in the crucible 1165 is then drained into the mold 1524 after the valve of the valve unit C has been opened. After the transfer has been accomplished between the crucible 1165 and the mold, the valve of the valve unit C is again closed.

The interior of the crucible 1165 is again connected with a source of helium under pressure through the pipe 1384 after receiving a new melt from the crucible 165.

Sampling of the now purified melt may now be made by transferring some of the melt in the crucible 3165 to the mold 3524 after the valve in the valve unit E has been opened and the melt solidified. In following the above process with the named materials, a Brinell test of the sample will indicate 148. Such a Brinell hardness reduction indicates the purification of the original metal through the removal of the contaminant elements. It is to be understood that when the sample metal has been transferred to the mold, the valve of the valve unit E is immediately closed.

Now, if desired, the metal within the crucible 3165 illustrated in FIGURE 4 may be further treated to alloy it with other materials which will provide the desired physical, mechanical and chemical properties of the titanium alloy.

In alloying the pure titanium metal, the cartridge 4066 has been brought to 1900° F. by the resistance heating elements 4020. The cylinder 4010 enclosing the cartridge 4066 and connected with the vacuum pipe 4046 is brought to a pressure of substantially 0.10 mm. pressure, and the valve 3078 is now moved rapidly to its open position. The cartridge 4066 is then released and drops downwardly into the molten material and the valve 3078 is then immediately closed. The cartridge 4066 is consumed in the melt and releases the alloying elements referred to above. During the time that the reaction takes place, helium under pressure is circulated through the bottom of the melt, agitating the same for a period of substantially three to five minutes. The valve of the valve unit E is now operated to discharge the melt from the crucible into an ingot mold 3524.

Prior to the use of any of the molds, but with especial reference to the mold 3524, the interior thereof is washed with a material of 90% ThO$_2$ and 10% HfO$_2$ and then fired or heated to approximately 900 to 1100 degrees F. The cap 3536 is now placed on the neoprene gasket 3532 and prior to the opening of the valve in the valve unit E, the closed mold 3524 is first vacuumed and is then placed under a helium pressure of from three to five pounds pressure, the gate valve 3574 having been first closed. The mold 3524 is now ready to be connected with the tubular member 3486. As the mold 3524 approaches the member 3484, the pipe 3510 is connected with a source of helium under pressure and thereafter the cap 3578 is removed from the lower end of the tubular member 3486. The prepared mold is now moved upwardly under the tubular member 3486 and this movement is continued until the lower end thereof engages against the upper side of the gate valve 3574.

The gate valve 3574 is then opened to permit the tubular member 3486 to descend in the mold cap 3536 until the refractory packing member 3492 disposed within the tubular member 3486 is substantially flush with the lower side of the cap 3536. The flange 3526 is now lowered until the gasket 3532 secured to the underside thereof is in sealing engagement with the upper end of the cap 3536. The valve in the valve unit E is now opened to permit the molten metal to pass through the refractory 3424 and downwardly through the opening 3494 formed in the refractory packing material 3492 for eventual discharge within the mold 3524. The transfer of the molten material is accomplished under helium pressure which is passed to the mold from the conduit or pipe 3566.

After the mold 3524 has been filled to its capacity, the valve of the valve unit E is turned to its closed position and the mold 3524 together with its cap 3526 is lowered downwardly until the lower end of the tubular refractory material within the tubular element 3486 clears the upper side of the gate valve 3574. At this time the gate valve 3574 is moved to its closed position and the mold 3524 together with its cap 3536 is moved downwardly out of engagement with the tubular member 3486.

At the instant the mold cap clears the lower end of the tubular member 3486 the cap 3578 is replaced thereon and the supply of helium to the passage 3194 through the tube or conduit 3510 is now shut off.

The mold 3524, and its cap 3536, after having been disengaged from the tubular member 3486, is cooled by connecting the upper tubular portion 3562A of the copper tubing 3562 with the source of coolant, such as, for example, water, which is connected to the water discharge system through the tubing section 3562B. The coolant continues to circulate through the tubing 3562 until the temperature of the titanium metal has reached a temperature below 800° F. At this time the coolant supply to the mold may be discontinued. The helium to the supply to the interior of the mold through the pipe 3566 is also cut off and the mold cap 3536 is removed in order that the ingot metal within the mold 3524 may be discharged therefrom. The alloyed titanium derived as an ingot from the mold 3524 will now be found to test a Brinell hardness of 288.

In the aforesaid operations and processes for preheating, melting, purifying, alloying and pouring commercially pure or titanium scrap it has been shown that the titanium was purified and the effect that such purification had on the hardness of the purified metal. In the disclosed method, commercially pure titanium which contained alloyed impurities had a Brinell hardness of 269. After the purification samples were taken and tested they showed a Brinell hardness of 148. When the alloying elements were added to the melt the alloyed titanium had a Brinell hardness which had increased to 288. The same composition processed with other prior methods would have a minimum Brinell hardness of 321 and high hardness of 363.

A second sample was processed through the continuous multi-stage cycle. The second sample had a Brinell hardness of 325 and comprised titanium scrap having the following composition:

| | Percent |
|---|---|
| Carbon | 0.52 |
| Nitrogen | 0.44 |
| Iron | 2.10 |
| Molybdenum | 2.13 |
| Chromium | 2.06 |

When the melting and purification processes were completed and the titanium recovered it had a Brinell hardness which was reduced to 288, thereby affecting a great improvement.

The equipment and processes may also be modified to perform as a single unit just as effectively as before and without departing from the principle of the operation and processes of the multi-stage apparatus.

The modified process, if properly carried out and correctly executed with the modified apparatus, will produce titanium ingots, billets, bars and castings of extreme purity and homogeneous uniformity and grain refinement with highly improved physical, mechanical and chemical properties. For example, commercially pure titanium was taken having a Brinell hardness of about 219 and a composition as follows:

| | Percent |
|---|---|
| Carbon | 0.050 |
| Nitrogen | 0.047 |
| Iron | 0.23 |

The scavenger composition and quantity thereof is, of course, based on the analysis of the material to be processed and in this case the following materials were used:

| | Percent |
|---|---|
| Lithium calcium silicate | 0.35 |
| Potassium permanganate | 0.65 |
| Magnesium cerium | 0.50 |

In this process only the charging and preheating apparatus illustrated in FIGURE 15 and the crucible 1165 of FIGURE 3 is used. The crucible is charged before the closure member 1356 is put in place and the charging apparatus is conditioned as described above. All of the valves are closed and the ingot mold is washed as in the previous operation and preheated at a temperature of about 1100° F.; the temperature of the preheater is adjusted to 1900° F.; the temperature of the melting crucible 1165 adjusted to 3240° F.; and the vacuum is turned on the entire system for evacuation and is left on until a mercury gage (not shown) indicates 0.10 mm. Then the vacuum is cut off and helium under a pressure of three to five pounds p.s.i. is supplied to the crucible. The loading chamber, however, remains constantly connected with the vacuum source at all times.

Prior to the application of the vacuum to the crucible 1165, a manganese cartridge of about two percent of the weight of the melt containing the above referred to scavenger composition is disposed on the valve 2078. The induction heating element is energized and when the visible observation is made that the metal is in its molten stage, the valve 128 is opened and the metal in the preheating apparatus is ejected by the operation of the ram head 66 into the interior of the crucible 1165. The valve 128 is then closed and the conduit 50 receives the next charge of the titanium metal. After the temperature in the preheating apparatus 156 has again reached 1900° F. the valve 128 is again opened and the ram head 66 operated to displace a second load of titanium metal into the crucible 1165. These operations continue until the amount of the melt has reached the desired quantity.

The temperature within the crucible 1165 is now lowered to about 3000° F. and helium under pressure is supplied to the interior of the crucible through the pipe 1384 and the passages 1346 and 1348. The helium is supplied to and bubbles through the melt at a pressure of one to three pounds p.s.i., while the helium normally supplied to the base of the crucible through the pipes 1230 is turned off.

Substantially at the same time, the valve 2078 is opened and connects the interior of the crucible 1165 with a source of vacuum through the pipe 2204. When the vacuum gage (not shown) indicates about 0.10 mm. the valve 2078 is opened widely to release the cartridge 2167 and its cap 2169 containing the scavenger compositions. The released cartridge and its cap descends downwardly through the mass of molten metal and comes to rest on the bottom 1326 of the crucible 1165 and is consumed therein. The gases released from the scavenger and improver elements permeates through the mass of molten titanium metal and moves upwardly therethrough and entrains therewith the carbon and nitrogen and carries the same to the surface of the melt whereby they may be picked up by the high vacuum.

The sublimated materials are condensed on the condenser sleeve 2148 and are crystallized thereon by the action of the coolant which flows through the coil or tubing 2138. When this reaction is completed, the valve 2078 is closed while the coolant continues to circulate through the condenser 2148.

The vacuum from the furnace jacket is now turned off and helium replaces the vacuum. The helium continues to bubble through the molten mass and when the condenser 2148 has cooled sufficiently to permit the removal thereof, the closure member 2186 is removed and the condenser 2148 is taken from the crucible. The condenser 2148 is replaced with the apparatus illustrated in FIGURE 20 of the drawings. It will be recalled that the device illustrated in this figure comprises a cylindrical member in which is supported an electrical resistance heating element 2028.

At this time an alloying cartridge is disposed on the valve 2078, the cartridge being identical to the cartridge 4066 referred to above in connection with the multi-stage apparatus and process. The closure member is now replaced and secured in the manner hereinbefore described and the resistance element 2028 is energized. The vacuum source is again connected with the pipe 2204 and when the vacuum gage indicates 0.10 mm. and the thermocouple 2186 indicates a temperature of 1700 to 1900 degrees F. the valve 2078 is quickly opened to release the alloying cartridge. Immediately thereafter the valve 2078 is closed. The helium which is passed through the passageway 1348 continues to agitate the melt for a period of from five to eight minutes in order to effect a complete homogeneous mass.

Thereafter, the pressure of the helium is lowered to the minimum necessary to keep the mass slightly agitated.

Reference is now made to FIGURE 1 of the drawings. In this figure, the valve unit D is shown as connecting the crucibles 1165 and 3165. In the instant process, however, a mold, such as the mold designated at 524, is connected with the discharge end of the valve unit D, replacing the crucible 3165. The mold is supplied with helium under about three pounds of pressure in the manner hereinbefore described, while the valve of the valve unit D is moved to its open position to permit the passage of the molten metal in the crucible 1165 to pass to the mold. After the mold has been filled to its capacity, the valve of the valve unit D is closed and the mold is disconnected from the apparatus while still remaining under helium. The mold is cooled in the manner described above to reduce the temperature of the melt. After the temperature thereof has descended to 800° F., or lower, the ingot or billet may be removed therefrom. At this time the helium source is disconnected from the mold since there is no longer any danger that the ingot will pick up oxygen.

Thus it is seen that one complete cycle of melting, purifying, and alloying titanium metals may be accomplished with but one of the crucibles, constructed in accordance with this invention.

In the preceding specification it is to be understood that while specific materials have been named in connection with the construction of elements of the apparatus, other materials having the same characteristics may be substituted therefor without departing from the scope of this invention. It must be also understood that all of the valves employed in the crucibles, the valve units, and the molds must be machined to provide a very close fit.

It should be further noted that the multi-stage apparatus described and illustrated herein is so assembled as to permit the apparatus to be quickly assembled and dismantled. This results in lowered maintenance costs.

A further unique feature of the apparatus resides in the construction of the crucibles, per se. Under actual operating conditions, only the innermost of the refractory elements will ever need replacement. By constructing each of the crucibles with a removable closure member at the upper end thereof, the replacement of these elements is facilitated.

Recognition should also be made of the fact that in the event any particular part of the apparatus should malfunction, the valve unit assemblies permit the malfunctioning equipment to be shut off and isolated from other parts of the apparatus without interfering with the operation of the latter.

It is also stressed and emphasized that if the above described apparatus and methods are followed precisely, there is no danger that the metals being treated will explode to harm personnel proximate thereto, a condition which is ever present with the apparatus and methods employed in the present day treatments of titanium metals.

The induction heating means illustrated in the three crucibles which surround the refractory elements disposed therein, and the induction heating means disposed within the valve units are energized only when found necessary to keep the molten metal at the proper temperature, and all fluid conduits are provided with a fluid under pressure, again, only when necessary to serve their respective functions. In actual practice, however, the auxiliary induction heating elements are energized in order to maintain the refractory elements and materials which they enclose at a substantially uniform temperature.

Having described and illustrated several embodiments of this invention in detail, it will be understood that they are offered merely by way of example, and that the invention is to be limited only by the scope of the appended claims.

What is claimed is:

1. A crucible for the metallurgical treatment of metals comprising a casing having opposed open and closed ends, a refractory base formed of permeable material disposed within said casing adjacent the closed end, induction heating means disposed on said base, said induction heating means having a cover therefor formed of a refractory material, an elongated substantially hollow element having opposed open and closed ends disposed within said casing with said closed end abutting said cover, a closure member for said open end of said casing, means releasably securing said closure member to said casing, said casing and said element having a metal charging opening formed therein adjacent their respective upper ends, said casing and said element having second openings formed therein adjacent their respective closed ends, means connected with said second openings for discharging molten metal from said crucible, and said casing and said element each having third openings formed therein in vertically and laterally spaced relation relative to said second openings formed in said casing and said element, and means connected with said third openings formed in said casing and said element for discharging molten metal from said crucible.

2. A crucible for the metallurgical treatment of metals comprising a housing having a pair of opposed open and closed ends, induction heating means disposed within said housing adjacent said closed end, a refractory element positioned within said housing, said refractory element having a pair of opposed open and closed ends with said closed end thereof being disposed adjacent said heating means, metal charging means extending through said housing and connected with the interior of said refractory element adjacent the open end of said housing, and molten metal discharge means connected with the interior of said element adjacent said closed end of said housing and extending through said housing.

3. A crucible as defined in claim 2, and a second molten metal discharge means extending through said housing and connected with the interior of said element adjacent said closed end thereof in laterally and vertically spaced relationship relative to said first discharge means.

4. A crucible as defined in claim 3, and means extending through said housing for supplying an inert gas to said closed end of said element exteriorly of the crucible chamber.

5. A crucible as defined in claim 4, and means extending through said housing for connecting said closed end of said element with a vacuum source exteriorly of the crucible chamber.

6. A crucible as defined in claim 2, and means for supplying said induction heating means with a fluid coolant under pressure.

7. A crucible for the metallurgical treatment of metal comprising a substantially hollow cylindrical casing having a pair of opposed open and closed ends, induction heating means disposed within said crucible and supported on said closed end thereof, said induction heating means being encased by a refractory material, an elongated substantially hollow cylindrical refractory element having a pair of opposed open and closed ends disposed within said casing with its said closed end engaging said refractory material, a second elongated substantially hollow cylindrical refractory element having a pair of opposed open and closed ends, said second refractory element being positioned within said casing in spaced relation relative to said first refractory element, a granulated layer of a refractory material disposed in said space between said first and second refractory elements, a third elongated substantially hollow cylindrical refractory element having a pair of opposed open and closed ends and being disposed within said second refractory element in spaced relationship relative thereto, a layer of granulated refractory material disposed in said space between said second and third refractory elements, said first refractory element being positioned in spaced relationship relative to the side wall of said casing, a helicoidal tube disposed in said last named space surrounding said first refractory element in spaced relation relative thereto, said casing having refractory materials interposed between said side wall thereof and said tube and between said tube and said first-named refractory element, a gasket extending across the upper ends of said refractory elements and materials, a closure member for said crucible releasably secured to the upper end thereof, said closure member having a refractory liner for the under side thereof, means extending through said casing and refractory elements adjacent their respective upper ends for charging said crucible, and means extending through said casing and refractory elements adjacent their lower ends respectively for discharging said crucible.

8. A crucible as defined in claim 7, including means forming a passageway through said closure member, refractory liner, gasket and third refractory element for connecting the lower end of said crucible with a source of helium under pressure, and means forming a passageway through said closure member and its refractory liner for exhausting said crucible.

9. A crucible as defined in claim 8, wherein said charging means comprises a preheating furnace for the metal to be treated, said furnace being at least partially within the crucible casing and refractory linings and comprising an elongated substantially hollow tubular member formed of a refractory material, said refractory member being disposed at its outer portion within an elongated substantially hollow conduit in concentric spaced relation relative thereto, heating means disposed intermediate said refractory member and said last named conduit, said refractory member having one of its ends extending through said crucible casing and said refractory elements and materials disposed within said casing and communicating with the interior of said third refractory element, said last named conduit having one of its ends releasably secured to said crucible casing, and valve means secured to the other end of said last named conduit for controlling the flow of metal into said last named refractory member.

10. The combination defined in claim 9, including ram means connected with said valve means for effecting discharge of said metal disposed in said last named refractory member into said third refractory element.

11. A crucible as defined in claim 7, wherein said discharge means includes first and second discharge means in vertically and laterally spaced relation each comprising an elongated substantially hollow tubular member having one of its ends releasably secured to said casing, a plurality of elongated substantially hollow tubular refractory members having opposed open ends, said refractory members being disposed within said conduit in concentric spaced relation relative to one another, granulated refractory materials disposed within the space between each adjacent pair of said last named refractory members, an elongated substantially hollow cylindrical refractory shell telescoped within said last named conduit, a helicoidal electrically conductive tube encased within said shell and having open ends, means connecting one of said ends with a source of fluid under pressure, means connecting the other end of said tube with a fluid discharge system, and means connecting said ends of said tube with a source of electrical energy.

12. A crucible as defined in claim 7, wherein said discharge means comprises an elongated substantially hollow tubular member having one of its ends releasably secured to the crucible casing, a plurality of elongated substantially hollow tubular refractory members having opposed open ends, said refractory members being disposed within said conduit in concentric spaced relation relative to one another, granulated refractory materials disposed within the space between each adjacent pair of said last named refractory members, an elongated substantially hollow cylindrical refractory shell telescoped within said last named conduit between the walls of said conduit and the refractory lining members, a helicoidal electrically conductive tube encased within said shell and having open ends, means connecting one of said ends with a source of fluid under pressure, means connecting the other end of said tube with a fluid discharge system, means connecting said ends of said tube with a source of electrical energy, and valve control means for controlling the flow of molten metal through the innermost of said last-named refractory members, said valve means comprising a refractory valve guide extending transversely through the refractory elements in said discharge conduit and having a bore coaxially aligned with the opening through the innermost of said refractory elements, a rising stem gate valve having a refractory gate element reciprocally movable in said valve guide to open and close said bore, a valve stem housing extending through said discharge conduit and providing a substantially sealed chamber through which said valve stem rises, heat-exchange means in said chamber for controlling the temperature of said valve stem, and means for supplying an inert gas to said chamber to insure exclusion of atmospheric contaminants to said valve.

13. A crucible as defined in claim 7, and valve control means for said discharge means.

14. A crucible for the metallurgical treatment of metal comprising a substantially hollow cylindrical casing having a pair of opposed open and closed ends, induction heating means disposed within said casing and supported on said closed end thereof, said induction heating means being encased by a refractory material, an elongated substantially hollow cylindrical refractory element having a pair of opposed open and closed ends disposed within said crucible with its said closed end engaging said refractory material, a second elongated substantially hollow cylindrical refractory element having a pair of opposed open and closed ends, said second refractory element being positioned within said casing in spaced relation relative to said first refractory element, a granulated layer of a refractory material disposed in said space between said first and second refractory elements, a third elongated substantially hollow cylindrical refractory element having a pair of opposed open and closed ends and being disposed within said second refractory element in spaced relationship relative thereto, a layer of granulated refractory material disposed in said space between said second and third refractory elements, said first refractory element being positioned in spaced relationship relative to the side wall of said casing, a helicoidal tube disposed in said last named space surrounding said first refractory element in spaced relation relative thereto, said casing having refractory materials interposed between said side wall thereof and said tube and between said tube and said first-named refractory element, a gasket extending across the upper ends of said refractory elements and materials, a closure member for said casing releasably secured to the upper end thereof, said closure member having a refractory liner for the under side thereof, said closure member having a pressure responsive gauge mounted theron and communicating with the interior of said third element, temperature responsive control means mounted on said closure member and communicating with the interior of said third element, transparent means mounted on said closure member for effecting visual observation of the interior of said crucible, and valve-controlled refractory-lined conduit means extending through said casing and refractory lining elements for charging and discharging said crucible.

15. A crucible for the metallurgical treatment of metals comprising an elongated substantially hollow casing having a pair of opposed open and closed ends, induction heating means disposed within said casing, said induction heating means comprising a refractory body supported on said closed end of said casing, said refractory body having a substantially centrally disposed boss integrally formed therewith and projecting away therefrom toward said open end of said casing, an induction heating element mounted on said body and said boss, a refractory element comprising a liner for said casing, said liner having a pair of opposed open and closed ends and being positioned within said casing with said closed end thereof proximate said boss, and a closure member for said open end of said casing.

16. A crucible for the metallurgical treatment of metals comprising a housing having a pair of opposed open and closed ends, a refractory body disposed within said housing and supported on said closed end thereof, said body having a centrally positioned boss projecting laterally away therefrom and towards said open end of said housing, induction heating means wound in a helicoidal configuration over said body and said boss, a refractory liner having a pair of opposed open and closed ends, said liner being positioned within the housing with said closed end thereof being proximate to and surrounding a portion of said boss, and a closure member for said open end of said housing.

17. A crucible as defined in claim 16, and induction heating means surrounding said liner, said induction heating means being interposed between said liner and said housing.

18. Induction heating means for the base of a crucible for the metallurgical treatment of metals, said induction heating means comprising a substantially cylindrical disc formed of a refractory material, a substantially centrally positioned integrally formed boss projecting from a side of said disc, said boss and said disc having communicating passageways extending therethrough, a helicoidal groove formed in said disc and continuing upwardly around said boss, a length of metallic tubing disposed within said helicoidal groove, said tubing having an end portion thereof extending downwardly through said continuous passageways, and means for connecting the opposed ends of said tubing with a source of high frequency alternating current.

19. Induction heating means for the base of a crucible for the metallurgical treatment of metals comprising a substantially circular disc formed of a refractory material and having a centrally positioned concave-convex depression formed therein, said helicoidal disc and said concave-convex depression having a continuous helicoidal groove formed therein, a length of metal tubing disposed within said groove, and means connecting the ends of said tube with a source of high frequency alternating current.

20. A crucible for the metallurgical treatment of metals comprising an elongated substantially hollow casing having a pair of opposed open and closed ends, induction heating means disposed within said casing, said induction heating means comprising a refractory body supported on said closed end of said casing, said refractory body having a substantially centrally disposed boss integrally formed therewith and projecting away therefrom towards said closed end of said casing, induction heating means mounted on said body and said boss, a refractory element comprising a liner for said casing, said liner having a pair of opposed open and closed ends and being positioned within said casing with said closed end thereof being proximate to and conforming to the configuration of said boss, and a closure member for said open end of said casing.

21. A crucible for the metallurgical treatment of metals comprising a casing having opposed open and closed ends, a base formed of permeable material positioned within said casing, a refractory element disposed on said base, electrical heating means mounted on said base, an elongated substantially hollow cylindrical element having opposed open and closed ends disposed within said casing with said closed end being proximate to said heating means, a closure member for said open end of said casing, means releasably securing said closure member to said casing, said casing and said element having a metal charging opening formed therein adjacent their respective upper ends, said casing and said element having an opening formed therein adjacent their respective closed ends, and means for supplying the interior of said element with an inert gas under pressure.

22. A crucible as defined in claim 21, and means for connecting the interior of said element with a source of vacuum.

23. A crucible for the metallurgical treatment of metals comprising a hollow cylindrical casing having opposed open and closed ends, a plurality of refractory elements disposed within said casing in concentric spaced relation relative thereto and to each other, refractory material disposed between the space between each pair of adjacent elements and the space between the outermost of said elements and said casing, a refractory-lined closure member for said casing, a conduit mounted on said closure member, said conduit having a pair of opposed open ends, means securing one of said ends to said closure member, a refractory liner disposed within said conduit and extending through said closure member into the crucible, said refractory liner having an axially extending passage therethrough communicating with the interior of said crucible, normally closed valve means extending transversely across said passage, a disc releasably secured to said other end of said conduit, said disc having an integrally formed substantially hollow elongated cylinder projecting upwardly therefrom, a housing mounted on said disc providing an annular chamber around said cylinder, the interior of said cylinder communicating with and in substantial alignment with the passage in the refractory liner of said conduit, an elongated substantially hollow cylindrical electrical heating device supported on said disc and enclosed by said housing, refractory material disposed between said housing and said heating device, a removable closure member for the upper end of said cylinder, and means for connecting the passage in said cylinder with a source of vacuum.

24. A crucible for the metallurgical treatment of metals comprising a hollow refractory-lined cylindrical casing having opposed open and closed ends, induction heating means in the refractory lining of said casing, a refractory lined closure member for said casing, a housing mounted on said closure member and providing a vertically elongated chamber, a refractory liner in the lower part of said housing having a lower end extending through said closure member into said crucible, said refractory liner having a passageway in substantially vertical alignment with said vertically elongated chamber and providing communication between said chamber and the interior of said crucible, normally closed valve means extending transversely across said passageway, the valve element of said valve means being of refractory material, said housing forming an annular chamber around said vertically elongated chamber, temperature control means disposed in said annual chamber for controlling the temperature in said vertically elongated chamber, a removable closure member for said vertically elongated chamber, and means for connecting said vertically elongated chamber with a source of vacuum.

25. The apparatus of claim 24 wherein said temperature control means consists of an annular electrical heating element disposed in said annular chamber.

26. The apparatus of claim 24 wherein said temperature control means consists of cooling coils disposed in said annular chamber.

27. The apparatus of claim 26 wherein said vertically elongated chamber is provided with a condenser sleeve for disposition of volatile metals, and wherein said means connecting said vertically elongated chamber with a source of vacuum is adapted to withdraw volatile materials from said crucible through said condenser sleeve.

28. The apparatus of claim 2 wherein the open end of said refractory element is provided with a circumferential groove and the walls of said refractory element are provided with a plurality of passageways communicating at their upper ends with said groove and having lower ends opening the adjacent closed end of said element into the interior of the crucible, and wherein means are provided for connecting said groove to a source of inert gas.

References Cited in the file of this patent

UNITED STATES PATENTS

| | | |
|---|---|---|
| 1,164,187 | Hovland | Dec. 14, 1915 |
| 1,718,627 | Bleecker | June 25, 1929 |
| 1,849,476 | Brace | Mar. 15, 1932 |
| 1,940,256 | Krebs | Dec. 19, 1933 |
| 1,971,195 | McKibben | Aug. 21, 1934 |
| 1,980,729 | Loppacker | Nov. 13, 1934 |
| 2,088,922 | Porteous | Aug. 3, 1937 |
| 2,104,514 | Galvin | Jan. 4, 1938 |
| 2,221,302 | Mizzy et al. | Nov. 12, 1940 |
| 2,286,481 | Fisher | June 16, 1942 |
| 2,325,203 | Hayes | July 27, 1943 |
| 2,338,606 | Vourhees | Jan. 4, 1944 |
| 2,423,213 | Weber | July 1, 1947 |
| 2,446,637 | Crampton et al. | Aug. 10, 1948 |
| 2,640,860 | Herres | June 2, 1953 |
| 2,688,682 | Bell | Sept. 7, 1954 |
| 2,937,789 | Tama | May 24, 1960 |